United States Patent
Paul et al.

(10) Patent No.: US 10,378,220 B2
(45) Date of Patent: Aug. 13, 2019

(54) STRUCTURAL/CONSTRUCTIONAL ELEMENT FOR FLOOR SYSTEMS

(71) Applicants: Petr Paul, Prague (CZ); Pavel Chovanec, Fulnek (CZ)

(72) Inventors: Petr Paul, Prague (CZ); Pavel Chovanec, Fulnek (CZ)

(*) Notice: Subject to any disclaimer, the term of this patent is extended or adjusted under 35 U.S.C. 154(b) by 0 days.

(21) Appl. No.: 15/419,636

(22) Filed: Jan. 30, 2017

(65) Prior Publication Data

US 2017/0362840 A1 Dec. 21, 2017

(30) Foreign Application Priority Data

Jan. 28, 2016 (CZ) ...................................... 2016-42
Jan. 26, 2017 (CZ) ...................................... 2017-45

(51) Int. Cl.
*F21S 8/02* (2006.01)
*F21V 3/06* (2018.01)
(Continued)

(52) U.S. Cl.
CPC ............ *E04F 15/225* (2013.01); *A63C 19/00* (2013.01); *B32B 27/08* (2013.01); *E04F 15/022* (2013.01);
(Continued)

(58) Field of Classification Search
CPC ... E04F 15/225; E04F 15/02183; E04F 15/20; E04F 2203/04; E04F 2201/0505
See application file for complete search history.

(56) References Cited

U.S. PATENT DOCUMENTS 10,138,638 B1* 11/2018 Deady ............... E04F 15/02183
2002/0108340 A1* 8/2002 Elliott ................... E04F 15/225
52/403.1

(Continued)

FOREIGN PATENT DOCUMENTS

CN 203222974 U 10/2013
CN 203603409 U 5/2014
(Continued)

OTHER PUBLICATIONS

Extended EPO search report and written opinion for Application No. 17466002.7 dated Jun. 14, 2017 (11 pages).*
(Continued)

*Primary Examiner* — Rodney Mintz
(74) *Attorney, Agent, or Firm* — Ostrolenk Faber LLP

(57) ABSTRACT

A structural element, including a base portion and a connecting central pin, has its base portion formed hallow, and having an internal reinforcement in the shape of WOW or MOM, to connect these elements with an insertable central pin so that the cross-section of the pin corresponds to the shape of the chamber between the reinforcements, when the upper surface of the structural element has longitudinal grooves, and is made from a modified polymer or elastomeric material comprising India rubber mixtures. The foundation is monomer ethylene propylene diene or natural rubber or styrene-butadiene rubber and/or combinations of the natural rubber/styrene-butadiene rubber, or thermoplastic elastomers, whose base is monomer ethylene-propylene-diene or polypropylene/monomer ethylene-propylene-diene or polyvinylchloride, or thermoplastic vulcanizates, whose base is monomer ethylene-propylene-diene and polyethylene or natural and/or synthetic rubber, modified by polyethylene or polypropylene.

22 Claims, 21 Drawing Sheets

(51) Int. Cl.

| | | |
|---|---|---|
| *G08B 7/06* | (2006.01) | |
| *A47C 21/06* | (2006.01) | |
| *A63C 19/00* | (2006.01) | |
| *B32B 27/08* | (2006.01) | |
| *E04F 15/02* | (2006.01) | |
| *E04F 15/10* | (2006.01) | |
| *E04F 15/18* | (2006.01) | |
| *E04F 15/20* | (2006.01) | |
| *E04F 15/22* | (2006.01) | |
| *F21V 33/00* | (2006.01) | |
| *F24D 13/02* | (2006.01) | |
| *H05B 33/08* | (2006.01) | |
| *H05B 37/02* | (2006.01) | |
| *E04F 15/022* | (2006.01) | |

(52) U.S. Cl.
CPC ...... *E04F 15/02183* (2013.01); *E04F 15/105* (2013.01); *E04F 15/185* (2013.01); *E04F 15/20* (2013.01); *F21S 8/022* (2013.01); *F21V 3/062* (2018.02); *F24D 13/024* (2013.01); *H05B 33/0854* (2013.01); *H05B 33/0872* (2013.01); *H05B 37/0236* (2013.01); *H05B 37/0272* (2013.01); *A47C 21/06* (2013.01); *B32B 2307/402* (2013.01); *B32B 2307/412* (2013.01); *B32B 2307/414* (2013.01); *B32B 2309/105* (2013.01); *E04F 2015/0205* (2013.01); *E04F 2201/0505* (2013.01); *E04F 2203/04* (2013.01); *F21V 33/006* (2013.01); *G08B 7/066* (2013.01); *Y02B 30/26* (2013.01)

(56) References Cited

U.S. PATENT DOCUMENTS

2011/0291804 A1* 12/2011 Chan ..................... A61H 3/066
    340/10.1
2013/0058089 A1* 3/2013 Chang ..................... F21V 21/00
    362/249.02

FOREIGN PATENT DOCUMENTS

| | | | |
|---|---|---|---|
| CN | 204080582 U | 1/2015 | |
| CN | 204080591 U | 1/2015 | |
| EP | 0783064 A1 * | 7/1997 | ............ B29C 65/56 |
| EP | 2163708 | 3/2010 | |
| FR | 2935012 A1 * | 2/2010 | ............. E04F 15/02 |

OTHER PUBLICATIONS

Search Report dated Oct. 26, 2016 in corresponding Czech Patent Application No. PV 2016-42.

* cited by examiner

STRUCTURAL/CONSTRUCTIONAL ELEMENT FOR FLOOR SYSTEMS

BACKGROUND OF THE INVENTION

The present invention relates to a structural material or element and, more particularly, to a material/element with improved construction properties.

Technical Section

This invention relates to structural/constructional element, which is applicable especially as a constructional, underlying, dampening, shock-absorbing and insulating material for diverse floor systems—its use is universal and its application is intended for following flooring systems: parquet, wooden, laminate-floating, vinyl, linoleum, casting epoxy, PUR+ other multi-layer polymer combinations, PVC flooring, sports flooring and self-leveling, multifunctional, industrial floors.

The solution relates also to the light panel according to CZ PV 2017-45, which shows a unique functional properties and is resistant to mechanical pressure or impact or shock.

Note: Throughout the specification, reference is made to measurements in the metric system, using S.I. units of measure. For general reference throughout the specification, when a reference is made to the unit of measurements "mm," the reference is to millimeters. A centimeter contains 10 millimeters and a meter contains 100 centimeters. One meter corresponds to 3.28 feet.

Current State of the Technique/Actual Technological Level

At present time in overwhelming majority of cases by the construction of a floor, as a primary structural/constructional element—there is used a wooden grate. There are more functions of a wooden grate within a traditional flooring systems—primarily it's the basic building/constructional base and underlying material, partially dampening+absorbing shocks—which causes partial cushion, mainly the wooden grate holds the whole flooring. The wooden construction is laid in linear/parallel way or perpendicular crossing structure, to the top are fixed OSB/hardboard panels and top floor layer/s in dependence on chosen flooring system. This is especially used for construction of sporting floors, factories, schools, exhibition areas etc. It is the most common and the world's widespread method of constructing and manufacturing floor surfaces.

This classic method has a whole range of disadvantages, which are caused due to the choice of the underlying material—the wood. These main disadvantages and weaknesses are: the whole flooring system based on the wooden grate has ordinarily an average height of 100 to 150 mm, whereby the majority of the space takes the wooden grate as itself. This creates unwanted space pockets which must be afterwards filled and sealed by mineral wool or other form of heat or noise isolation. Alternatively there is installed a ventilation system, placed under the floor in these pockets (needed an air circulation due to the wooden grate)=expensive installation and operation costs! If used on sports hall, e.g. volleyball, basketball etc., the noise insulation is necessary for eliminating unwanted noise effects (shocks from balls and impacts from players), echoes . . . etc. Next negative effect is associated reduction in clear height of the room (resp. reducing the height of the ceiling)—decreases the volume of usable space for living and/or increases the height of the building (e.g. in the case of a 20-storey building, the difference of 80 mm/each floor will case in total the difference in the whole building height of 1.60 meter!), next big weakness of wood is all above its dimensional instability—swelling, expansion and changes in shape+volume related to variable humidity. With this are associated "sound effects" as creaking, the system must be ventilated very often, wood is not flexible material on itself.

Biodegradable processes (rots, molds, micro-organisms)+ highly sensitive material to humidity, which represents a big problem with transportation (water condensation, rain, evaporating . . . etc.), wood worms, dry rots, pests—susceptibility especially during transport (psychopathological and veterinary limitations/restrictions/dry rot/wood-worm/microbes etc., next big disadvantage is combustibility—high susceptibility to fire. This all leads to huge need of prevention in the form of a chemical treatments—protective coating for impregnation, protection against pests and microorganisms, fire protective coatings or surface finish (big consumption of emulsions, stains, lacquers, varnishes . . . etc.).

Wood a itself doesn't cause any desired effect of "dampening", which has to be achieved through structural design (grid structure) or by combination of wood with other materials (rubber dampening pads etc.), with this is associated high consumption of valuable natural resource—additionally only selected species of wood are usable for these purposes and the lifespan of used wood is limiting the lifespan of the floor.

With the progressive technical development within the lighting elements and technologies, we can observe for several decades a significant expansion of their use, whereby the lighting source is already not fulfilling only its primary and basic function, i.e. increase of luminosity in dark environment (change of value of the units: "lumen" and/or "lux", e.g. outdoor surroundings during the night and/or dark places/rooms within the interior), but has found its use in the segment of promotion, advertising, design, navigation and safety elements, culture, arts or entertainment industry, etc. In particular, with the arrival of LED technology—whose main advantage lies in a very favorable size of the light source (small dimensions), but simultaneously shows a high level of performance and intensive lighting effect, all with relatively low power consumption and long life-time of the lighting source—there was recorded significant increase in demand, consumption and use of lighting source as a design-creating element with new the function of so-called mood lighting (sometimes called also "atmosphere-light"), which is characterized especially by optional change of optical properties and light effects, like regulation of light intensity coming from LED-light source, variable color spectrum (adjustable color tones), including other associated features—for example, adjustable control unit/software, which changes light intensity and color tones, depending on actual acoustic situation in the room and reacts on currently playing music, rhythm and style. With the arrival of LED technology there is certainly to see a big extension of options for the use of light sources in the form of new LED light fixtures, lamps, panels, chandeliers, LED Strip, ropes or the navigation and signaling devices.

Anyway, the LED-light discovery as big improvement doesn't mean anything else than the change/extension of options within the optical lighting-function/luminance, when the LEDs have just replaced the previous less efficient light-sources like bulbs, fluorescent tubes, halogen lamps. Etc. All this light-media, however, have one common limiting denominator—a very low mechanical resistance, since they are the easily breakable and fragile.

Typical structure of the current LED lighting panel consists in particular of the base plate and support frame (metal, plastic), under which are placed the lightning LED-diodes (possibly right into the frame after the circuit), in-between there usually placed different kinds of interlayer films (reflective, color-changing, UV protective, diffusion, filters) and the most-upper visible layer is created from of a light-permeable (translucent) composite or glass plate with relatively small thickness (2-5 mm), with various diameters—typical size from 300×300 mm to 600×600. As a typical material for this application, there are used following polymers: "Acryl-Glass" which means poly (methyl methacrylate) (PMMA), styrene-acrylonitrile copolymer (SAN) or polycarbonate (PC).

From the previous argumentation it's evident, that in the case of sudden action of mechanical forces—impact, shock or pressure, the most-upper light cover panel will be easily broken and the whole construction including the light media suffers an irreversible mechanical destruction, what is certainly a unwanted effect and very limiting factor in terms of possible applications and practical use.

SUMMARY OF THE INVENTION

All above mentioned troubles and problems are solved with the new constructional element, consisting of the "base" and a central pin—whereby the main principle of the invention insists in the hollow air pockets and stiffeners in the form of dampening lamellas in the shape of "v", which creates together a stable underlying system (subfloor base), which disposes with a perfect connectivity due to the central whole and pin, with an excellent shock-absorbing and dampening function (noise, heat) without any need of additional insulation, whereby the surface of the element is designed as anti-slip surface with grooves of depth 2 mm and width 5 mm, created from especially modified thermoplastic compounds (blended from a plastic+rubber), namely composed from EPDM (Ethylene-propylene-diene-monomer) and/or SBR (Styrene Butadiene Rubber) or their combinations, further (Ethylene-propylene-diene-monomer) and/or polypropylene or synthetic rubber modified with polyethylene and/or polypropylene and/or elastomeric material based on India rubber mixtures, of which foundation is monomer ethylene-propylene-diene or natural rubber or styrene-butadiene rubber and/or combination of the natural rubber/styrene-butadiene rubber, or further based thermoplastic elastomers, which base is monomer ethylene-propylene-diene or polypropylene/monomer ethylene-propylene-diene or polyvinylchloride, or further based thermoplastic vulcanizates, whose base is monomer ethylene-propylene-diene and polyethylene or natural and/or synthetic India rubber, modified by polyethylene or polypropylene, wherein India rubber mixtures based on monomer ethylene-propylene-diene consist of 20 to 50% vol. monomer ethylene-propylene-diene, 0.5 to 2% vol. vulcanizing agent, 20 to 50% vol. fillers and 20 to 50% softeners; India rubber mixtures based on natural rubber consist of 20 to 50% vol. natural rubber, 0.5 to 50% vol. fillers, 20 to 50% vol. softeners, 0.5 to 2% vulcanizing agent, up to 1% vol. of stearin and up to 2% vol. of antioxidants, up to 2% vol. of accelerators; India rubber mixtures based on styrene-butadiene rubber consist of 20 to 50% vol. styrene-butadiene rubber, 0.5 to 2% vol. vulcanizing agent, 20 to 50% vol. fillers and 20 to 50% vol. softeners; India rubber mixtures based on natural rubber/styrene-butadiene rubber consist of 20 to 50% vol. mixtures of natural rubber and styrene-butadiene rubber, 0.5 to 2% vol. vulcanizing agent, 20 to 50% vol. fillers and 20 to 50% vol. softeners; thermoplastic elastomers based on monomer ethylene-propylene-diene; thermoplastic elastomers based on the mixture of polypropylene/monomer ethylene-propylene-diene; thermoplastic elastomers based on polyvinylchloride; thermoplastic vulcanizates based on monomer ethylene-propylene-diene.

The structural/constructional element according to the invention is characterized by the center groove line on the upper surface which is color-coded.

The structural/constructional element according the invention is also characterized by the lower surface which is also fitted with anti-slip grooves as the final surface.

The structural/constructional element according the invention is additionally characterized by the adhesive tape inserted to the central groove on the lower surface (bottom), which is covered by a removable foil.

The structural/constructional element according the invention is additionally characterized by the pin being formed from the same material as the whole base portion of the structural/constructional element.

The structural/constructional element according the invention is additionally characterized by the internal reinforcement having the shape of WOW or MOM or any other shape, size, strength or composition of dampening lamellas.

The structural/constructional element according the invention is additionally characterized by the vulcanizing agent being formed by a sulfur or peroxide.

The structural/constructional element according the invention made on the basis of Natural raw rubber/India rubber is typical for its properties which are high chemical resistance and durability including a high resistance to ozone.

The above mentioned disadvantages are eliminated by the new light panel according to the invention, whose essence consists in its composition—created at least of one uppermost transparent or translucent plate, which is supported with specific self-carrying/load-bearing, dampening structural/constructional elements (placed under the top-layer plate) made of a transparent, translucent or colored polymer (incl. Black) and/or the modified polymer in the form of a thermoplastic elastomer or vulcanizate, having a hardness of 30 to 90 'ShA, whereby below, in and/or between these supporting/carrying structural/constructional elements are placed lightning sources, equipped with remote control for regulation of light intensity and adjustable color shade choice.

Light panel according to the invention is characterized by the fact that it is connected/fixed through the structural/constructional elements with the underlying base plate, which consists of at least 1 single plate or solid surface to which is the whole panel fixed and the base plate is equipped with reflective/light-reflecting layer. (e.g., silver mirror color).

Light panel according to the invention is characterized by, that the light source is made up of LED diode strips.

Light panel according to the invention is further characterized by, that the top-layer plate is made of composite/polymeric material based on polyethylene (PE), polypropylene (PP), poly-methyl methacrylate (PMMA), styrene-acrylonitrile copolymer (SAN), polycarbonate (PC), polyvinyl chloride (PVC) and/or transparent silicone including their mutual combinations, while their thickness varies from 5 mm to 20 mm depending on kind of application and intended use of the light panel.

Light panel according to the invention is further characterized by, that composes of one or more plates that are translucent and/or transparent and/or colored (including black color) with a modified surface.

Light panel according to the invention is further characterized by, that its top-layer panel (s) are provided with a diffusing foils or other protective film(s), which is applied (mostly with glue) on the top or bottom (the kind and presence of the film/foil depends on the quantity of plates and intended use of the panel), further the plates may be interspersed with foil in more layers, at least the most-upper layer plate is provided with a foil.

Light panel according to the invention is also characterized by, that the base plate is made of composite material based on polyvinyl chloride (PVC), polyethylene (PE), polypropylene (PP), polycarbonate (PC) or OSB panels with a thickness of 6-10 m (in case of need also higher thickness of the base plate may be applied).

Light panel according to the invention is characterized by, that in, below, and/or between structural load-bearing elements are placed at regular intervals LED strips, with LED spacing intervals from 20 to 80 mm, depending on the height and type of the light panel.

Light panel according to the invention shows high resistance to mechanical damage, in the sense of action/affecting by: impact, shock, stroke or constant pressure or cyclic shocks, in particular thanks to the unique self-supporting, but at the same time flexible and shock-absorbing construction. The essence of the invention lies in the specific construction, based on the structural/constructional element according to Application CZ PV 2016-42, which has self-supporting ability, is very stable but at the same time flexible, showing great dampening and shock-absorption properties. Further the light panel according to the invention is characterized by the choice of individual components and their combination and technical composition, which ultimately enables high variability and universal usage in a lot of various segments and areas (industry, communal and private sphere. etc.).

Light panel according to the invention disposes of unique functionality, be efficient multiplying of all following functions: protection, decoration, home- and industrial design, lighting, dampening, shock-absorbing, slip-resistance, heating, insulation, signalization, navigation, entertainment, with the option of a skin within the installed floor or wall surfaces, which certainly greatly extends its application possibilities in practice.

Light panel according to the invention can be applied in different ways for its various uses. In the case of uneven subfloor/inappropriate basic surface, there are applied the base underlying plates (composites: PVC, PE, PP, PC, or OSB board thickness 6 to 10 mm), onto which are placed and installed structural/constructional elements structural/constructional elements made of polymer or modified polymer with hardness of 30 to 90 'ShA (hardness of the chosen polymer depends on the anticipated operating strength and estimated type of load—random or cyclical shocks, constant pressure . . . etc., next factor is the direction of installation—horizontal or vertical position) and/or modified polymer in the form of thermoplastic elastomer or vulcanizate, which means polymer compound composed/combined of rubber and plastic polymer. Between the load-bearing structural/constructional elements are placed at regular intervals LED strips or other light source (spacing from 20 to 80 mm, depending on height of the entire system, the type of LEDs and the intended application), which are equipped with remoted regulation of shine intensity, with adjustable choice of color shade, based on the system "RGB+White" with at least 60 installed LED-Diodes to 1 running/linear meter of the LED-strip. The light source can be controlled remotely. Construction of the light panel ensures its high mechanical strength, stability, resistance and carrying capacity (on the base of estimated use follows the selection of polymer(s)—e.g. if there is expected an intensive action and affection of mechanical strengths—the most appropriate polymer choice for the top-layer plate will be polycarbonate (PC), in particular due to its toughness, in terms of shock-absorption and/or impact control show excellent results combination and composition of plates made of "silicone+polycarbonate/polycarbonate+silicone."

Light panel according to the invention can be installed in consistently humid or even wet environment, or even below the surface of the water or ice.

The structural/constructional element can be equipped with a heating system, what is suitable, in particular, for heat sensitive places—like children's rooms, hospitals, nursery schools/kindergarten or preschool facilities for the education of children or any similar buildings if needed. Generally for the construction of the light panel according to the invention, there are used as top-layer plate, mainly following material and/or their combinations: polyethylene (PE), poly-methyl methacrylate (PMMA), styrene-acrylonitrile copolymer (SAN), polycarbonate (PC), polyvinyl chloride (PVC) and transparent silicone. The top-layer plates are installed in thicknesses from 5 mm to 20 mm, depending on kind of application—they are translucent (with various levels of light-transmittance), transparent or colored (even the original polymer is colored or covered with a tinting foil/filter), design of the surface is smooth, satin, soft-touch, non-slip, fine or coarse structured with different kinds of optional décor due to the application of decorative foil. Onto the structural/constructional elements, there are placed 1,2 or more polymer plates and represent the final surface layer, which disposes with a very smart fixation system in the form of mechanical locks (optional application of different functional films between the individual polymer plates—protective, diffusion, tinting. etc.), the upper-most polymer plate surface is optionally covered with diverse functional films (tint, anti-slip, decorative, protective, reflective, diffusing, touch . . . etc.).

The structural/constructional element according the invention is easily manufactured and is suitable for floor areas, sports surfaces, multifunctional leveling floors, floorboards. Spacing and depth of the grooves on the upper and lower surface (top and bottom) of the element may be the same or different as well as dampening lamellas.

The structural/constructional element according the invention has many advantages, for it was developed in cooperation with leading experts in sports and enables a completely revolutionary system laying floors, which brings big savings of—time, financial, personnel and ecological, because it eliminates the use of a wooden grate. Thanks to the central guiding line is the floor installation fast and precise and this brings a significant reduction in the time needed for the installation compared to traditional systems. The adhesive tape on the lower surface accelerates the installation particularly in the cases where it is necessary for the base portion of the structural/constructional element to be divided in to smaller portions. The overwhelming resistance of the structural/constructional element according to the invention against water, humidity, alkalis, acids, molds, ozone and long-term aging ensures its durability for at least 30 years, eliminating the need to replace the system. In addition, it is fully recyclable.

The main advantages of the structural/constructional element according to the invention against the current wooden grate consist in the fact that the new element is dimensionally stable without any effects of material degradation, it is nonflammable therefore there is no need to use any protective coating, it is not subject to the biodegradable process (decay+mold+microorganisms), it is not necessary to treat it with coatings or emulsions to prevent the occurrences of organisms, there is no need for any psychopathological or veterinary restrictions. Yet given coatings have a lifespan of up to 7 years, so with the currently used floor installation methods the coatings should be refreshed periodically to ensure their effectiveness. There is a significant reduction in the overall height of the floor system from 60 to 100 mm by using the structural/constructional element according to the invention and therefore it does not produce any underfloor pockets, which would need to be filled with damping fillers! It is 100% waterproof, so in the case of accidental ingress of unwanted moisture through the original floor penetration this element does not change its shape or properties, shorten its lifespan or creates a raised pocket on the surface of the floor! The structural/constructional element according to the invention further has excellent damping and shock absorption properties (shakes). In addition, it is possible to modify these properties thanks to the optional hardness of the element and it is designed to absorb sound—thanks to the profiles unique design with oblique slats in the shape of the letter "W" has an excellent sound dampening properties, it is not necessary to fill the space between the individual profiles like it is the case with the wooden grate. The central colored guide line for clear orientation during installation accelerates work and joining the elements to any lengths, speed of installation with this element is up to 3× faster than a conventional system.

Floor made like this is permanent after a pressure deformations, it does not soak up, it is airy without the need of ventilation, non-slip thanks to the used material and a non-slip grooves on the surface of the elements. It is heat-resistant and stable. The structural/constructional element according to the invention complies with all safety and hygiene standards.

Light panel according to the invention disposes of unique functionality, be efficient multiplying of all following functions: protection, decoration, home- and industrial design, lighting, dampening, shock-absorbing, slip-resistance, heating, insulation, signalization, navigation, entertainment, with the option of a skin within the installed floor or wall surfaces, which certainly greatly extends its application possibilities in practice.

Light panel according to the invention can be applied in different ways for its various uses. In the case of uneven subfloor/inappropriate basic surface, there are applied the base underlying plates (composites: PVC, PE, PP, PC, or OSB board thickness 6 to 10 mm), onto which are placed and installed structural/constructional elements structural/constructional elements made of polymer or modified polymer with hardness of 30 to 90 ' ShA (hardness of the chosen polymer depends on the anticipated operating strength and estimated type of load—random or cyclical shocks, constant pressure . . . etc., next factor is the direction of installation—horizontal or vertical position) and/or modified polymer in the form of thermoplastic elastomer or vulcanizate, which means polymer compound composed/combined of rubber and plastic polymer. Between the load-bearing structural/constructional elements are placed at regular intervals LED strips or other light source (spacing from 20 to 80 mm, depending on height of the entire system, the type of LEDs and the intended application), which are equipped with remoted regulation of shine intensity, with adjustable choice of color shade, based on the system "RGB+White" with at least 60 installed LED-Diodes to 1 running/linear meter of the LED-strip. The light source can be controlled remotely. Construction of the light panel ensures its high mechanical strength, stability, resistance and carrying capacity (on the base of estimated use follows the selection of polymer(s)—e.g. if there is expected an intensive action and affection of mechanical strengths—the most appropriate polymer choice for the top-layer plate will be polycarbonate (PC), in particular due to its toughness, in terms of shock-absorption and/or impact control show excellent results combination and composition of plates made of "silicone+polycarbonate/polycarbonate+silicone."

Light panel according to the invention can be installed in consistently humid or even wet environment, or even below the surface of the water or ice.

The structural/constructional element can be equipped with a heating system, what is suitable, in particular, for heat sensitive places—like children's rooms, hospitals, nursery schools/kindergarten or preschool facilities for the education of children or any similar buildings if needed. Generally for the construction of the light panel according to the invention, there are used as top-layer plate, mainly following material and/or their combinations: polyethylene (PE), poly-methyl methacrylate (PMMA), styrene-acrylonitrile copolymer (SAN), polycarbonate (PC), polyvinyl chloride (PVC) and transparent silicone. The top-layer plates are installed in thicknesses from 5 mm to 20 mm, depending on kind of application—they are translucent (with various levels of light-transmittance), transparent or colored (even the original polymer is colored or covered with a tinting foil/filter), design of the surface is smooth, satin, soft-touch, non-slip, fine or coarse structured with different kinds of optional décor due to the application of decorative foil. Onto the structural/constructional elements, there are placed 1,2 or more polymer plates and represent the final surface layer, which disposes with a very smart fixation system in the form of mechanical locks (optional application of different functional films between the individual polymer plates—protective, diffusion, tinting. etc.), the upper-most polymer plate surface is optionally covered with diverse functional films (tint, anti-slip, decorative, protective, reflective, diffusing, touch . . . etc.).

Thanks to the new technical solution and construction system of the light panel according the invention—it is possible to build up arbitrary large lightning areas—e.g. extensive floorings (composed of unlimited quantity of light panels as constructional units), without disturbing the final surface with unsightly connecting particles like joints, junctions, construction-ledges or aluminum profiles—like in the case of present light-equipped floor systems, whose surface is always divided in squares (place for hiding of cable+accessories). Without the usage of this new light panel according to the invention, the optical and design properties of the floor surface are broken due to the squares which are formed from the AL-profiles as a base, bringing next typical negative feature—a very hard surface (glass as top-layer cover), because of any use/presence of dampening or impact absorbing elements, which would control the vibrations and absorb the shocks, caused by walking or dancing people (music clubs, dancing disco-halls). Hardness of such a floor has a very negative influence on the human body, especially women while wearing the high-heel shoes are often affected with health-problems in the form of lower back pain, lumbar or cervical spine and/or suffer with deformation of the foot arch! These negative effect doesn't occur in the case of installation of the new light panel according to the invention as flooring system, because the whole flooring works with dampening function and impact control.

Handling of the light panel according to the invention and its installation is very fast, safe and easy in its installation is very fast, safe and easy, its maintenance, cleaning and reparability is seamless, whereby panel has stable and constant properties within wide range of temperature from −40 to +120° C. In the case of accidental, extreme affecting of intensive mechanical load and the subsequently caused damage, the panel is panel very easily and quickly repairable and can be fixed by using of eccentric Sander and/or rotating polisher—which will remove due to abrasion all potential surface defects of the top plate. Subsequent application of new protective and/or decorative layer of top film restores the required properties and we reach easily full surface homogeneity—at minimal cost. Thanks to the optional and changeable film on the top surface, it is very easy, quick and inexpensive to change significantly complete the look/design and optical properties of the whole lighting surface, created from light panel according to the invention. Even in the case of need for changing of the light source—the light panel according to the invention allows quick and easy replacement only of required parts of the light source. The whole light panel as well as its each component is fully ecologically recyclable, which represents for sure a great benefit for the future.

BRIEF DESCRIPTION OF THE DRAWINGS

FIGS. 27A, 27B, 27C and 27D present various types of structural/constructional elements 34 according to EN PV 2016-42, used as essential building element by construction of the flooring system, consisting of several pieces/fields of the light panel according to the invention, wherein:

A) structural/constructional element according to EN PV 2016-42 "X"-shaped, made of "2-Component-Silicone" transparent, Hardening system binder+catalyst, hardness of 45 to 50 'Sha, size of individual element is 40×40×40 mm, the joined scheme shows redistribution/spacing within the light panel according to the invention (B) structural/constructional element according to EN PV 2016-42, with the design of dampening lamellas as "WOW" or "MOM" (optional designing+size), made of transparent PVC; The shape, form, ribbing of the structural/constructional element can be customized and optionally designed—depending on the required properties of elements, e.g. by increasing/reducing the quantity of lamellas, air chambers or side-wall thickness, while the reachable height of structural/constructional element varies within the range: from 7 to 70 mm.

(C) structural/constructional element according to EN PV 2016-42 in rolls with the shape of "WOW" or "MOM" based on EPDM compound, white and black color with different hardness level (black'65 Shore, white 80's Shore), (D) structural/constructional element according to EN PV 2016-42 made of rubber mixture based on NR/SBR Natural rubber+synthetic Styrene-Butadiene-Rubber) in black design with dampening lamellas in the shape of five "X".

Figure 28A:
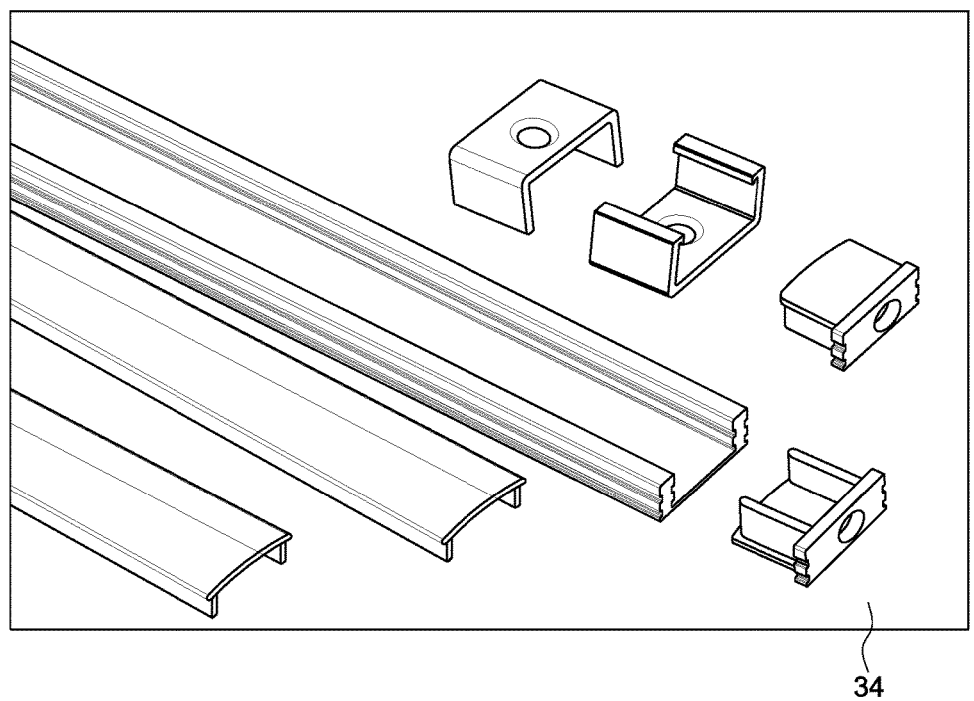
Figure 28B:
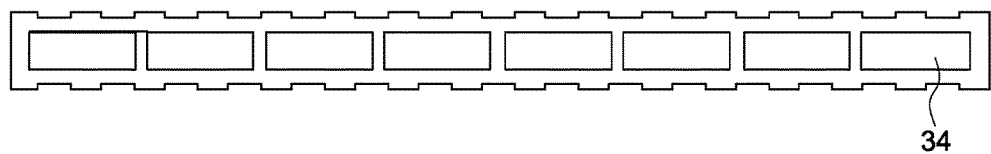
Figure 29:
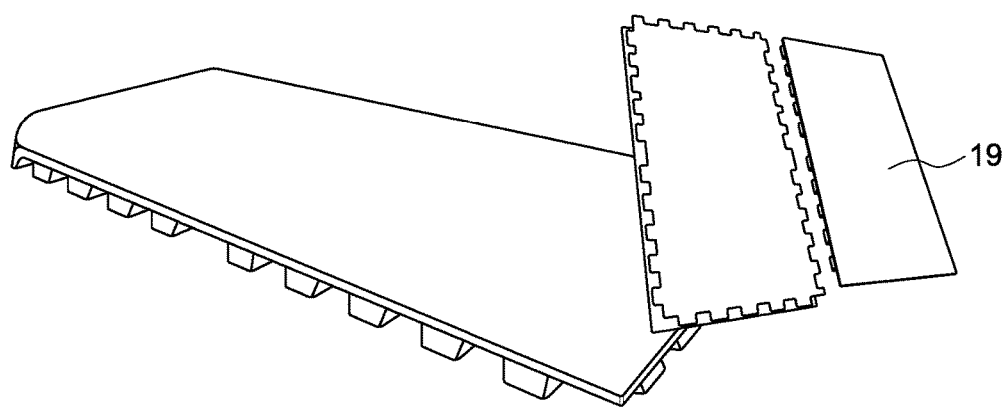
Figure 30:
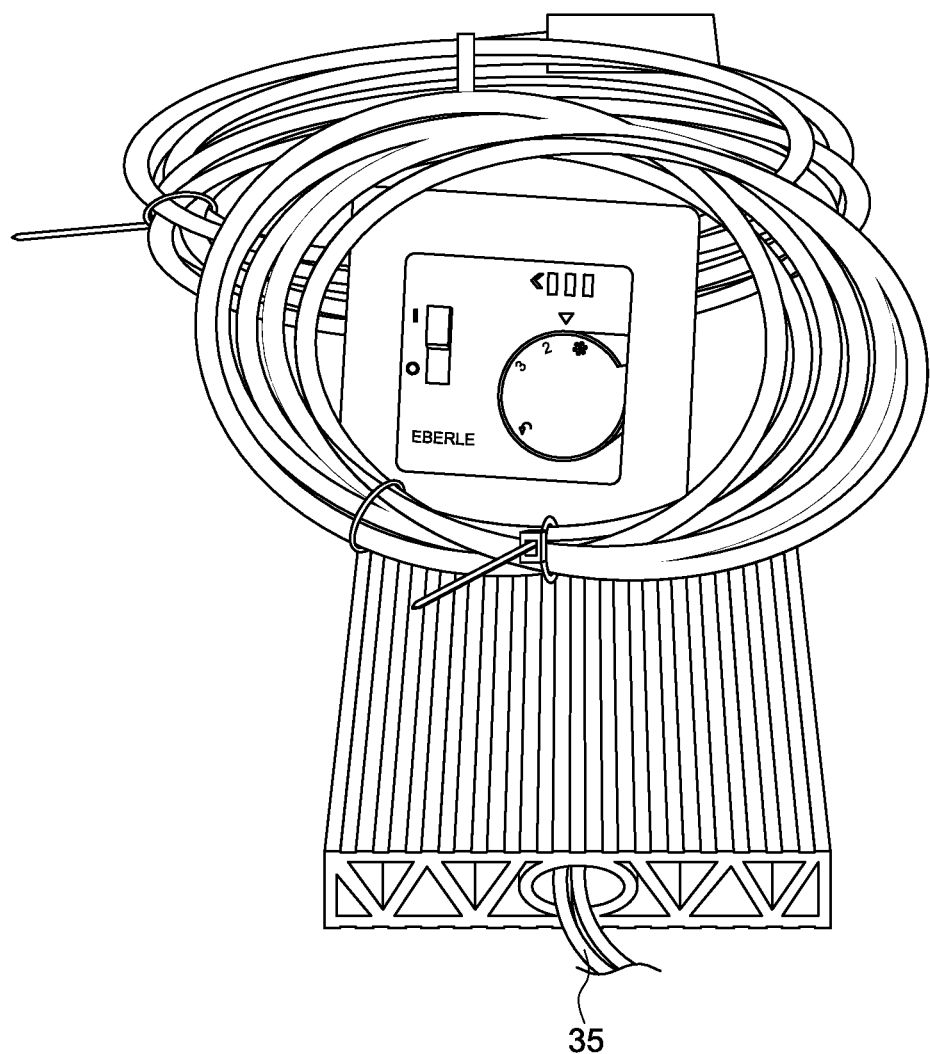
Figure 31:
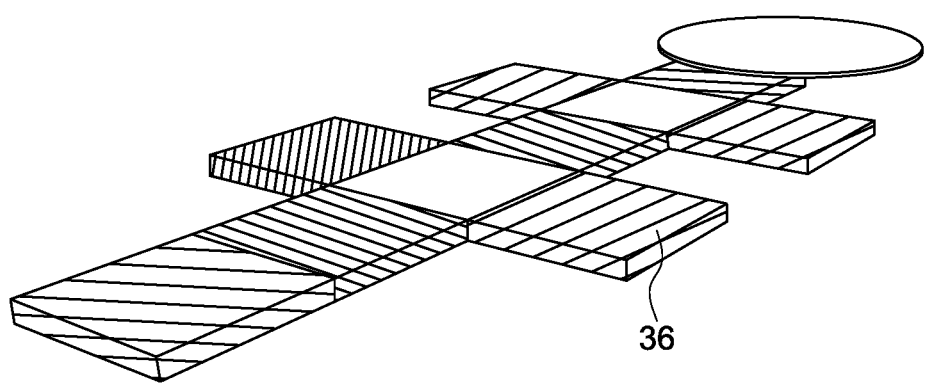

FIG. 28A there is illustrated the spacing template or installation slot for a correct, simple installation and placing of the LED strips to the base plate of light panel according to the invention, while optimal range for interval between each strip varies from 20 to 80 mm. Note: Template/leading bar allows additional usage of its own cover as a diffuser-application is not required in all cases, it depends on individual needs of the consumer, technical requirements and intended use of light panel according to the invention;

FIG. 28B there is shown and alternate solution for the location of the LED strips in engineered structural/constructional element according to EN PV 2016-42, for application within the floating floors or heated flooring systems;

FIG. 29 there is shown the top-layer connection system—mechanical fixing locks for the upper surface of the light panel according to the invention, which creates a "junction free" link, with visually clean and homogeneous flat surface, not disturbed with above mentioned unwanted squares;

FIG. 30 there is shown structural/constructional element according to EN PV 2016-42, equipped with an integrated heating system 35 (based on electrical induction, placed in the central hole, equipped with remote temperature control and timing options (switching on/off);

FIG. 31 there is shown the light panel 36 according to the invention, creating a very well-known children's game/playing field—the "Hopscotch", composed from ten squares and 1 circle, with the aim of supporting the physical activities for children;

Following examples of execution of the structural/constructional element according to the invention only illustrate, but do not limit. This element was successfully tried and tested by its originators at the appropriate laboratory equipment, used in a number of applications—as the laying of a new floors, renovation of an old floors in homes, it was used as a medium for damping vibrations, noise and shock absorption in public facilities, sports fields and sports buildings, production halls and other.

DETAILED DESCRIPTION OF THE INVENTION

Example 1—Portable Variable Flooring for Sports Use

On a flat, stable surface in nature (garden, yard, playground . . . ) were laid strips of the structural/constructional element according to the invention the width of 80 mm and length of 1.25 m with a spacing of 0.24 m. Primary part 1 of this element was hallow and with inner reinforcement in the form of ribbing 18 in the shape WOW, which provides connectivity of the structural/constructional elements by inserting a central pin 2 so that the cross-section of the pin 2 corresponds to the hole 10 between the ribs 18. The structural/constructional elements were fitted on the upper surface 3 by the anti-slip longitudinal grooves 4 a depth of 2 mm and width of 5 mm and a white a central groove 5 on the upper surface 3 and lower surface 6 was also fitted with an anti-slip grooves 7 as the upper surface 3 the structural/constructional element according to the invention. The white color on a central groove 5 can be applied imprinted on the structural/constructional element according to the invention or it can be applied to the appropriate place during the production of the element by applying colored substance and this creates the guiding line. To the center groove 8 on the lower surface 6 was inserted an adhesive tape 9, which was covered by a removable foil. Individual structural/constructional elements were connected by a pin 2.

Figure 10:
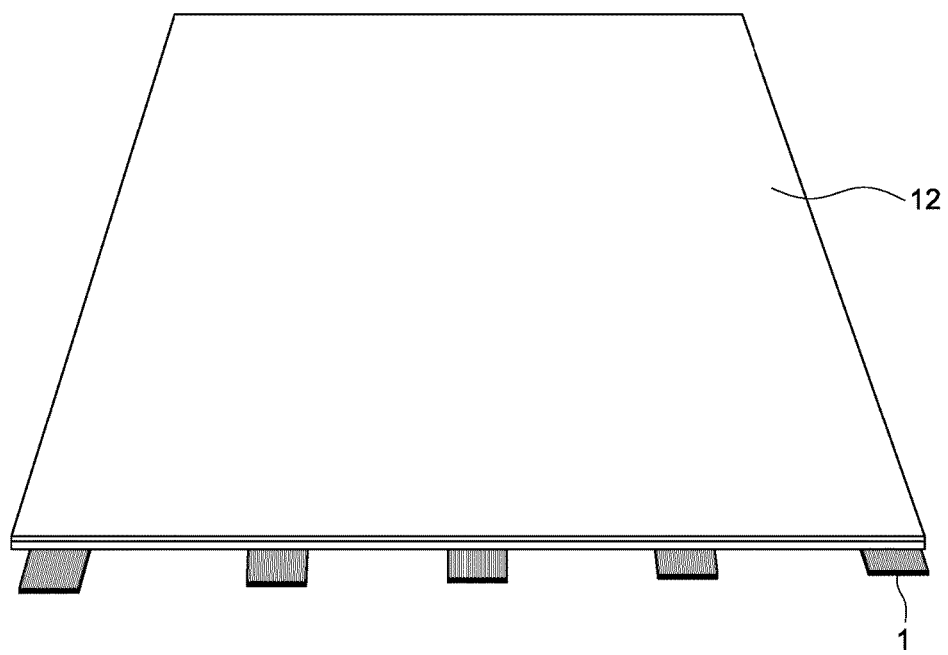
FIG. 10 is photo of 1 polygon for portable sports field.

On the laid out structural/constructional elements according to the invention were laid chipboard panels 12 without any chemical treatment, to which was applied multilayer coating system of a multifunctional self-leveling floor. The big advantage is that the resulting floor can be easily removed at any time and transferred elsewhere. It is possible to variably create a floor from the basic polygon the size of a 1.25 m×1.25 m as shown in FIG. 10.

This structural/constructional element and a pin 2 were made from a modified polymer and/or elastomeric materials based on India rubber mixture, whose basis is a monomer ethylene-propylene-diene in an amount of 40% vol., further 1.5% vol. sulfur-based vulcanizing agent, 35% vol. fillers based on carbon black and 23.5% vol. paraffinic softeners.

Example 2—Renovation of the Balcony Floor

For the renovation of the balcony floor were the structural/constructional element according to the invention and the example 1 laid freely on a flat, stable surface. The size of the balcony floor was 3.6 m×0.85 m.

Figure 11:
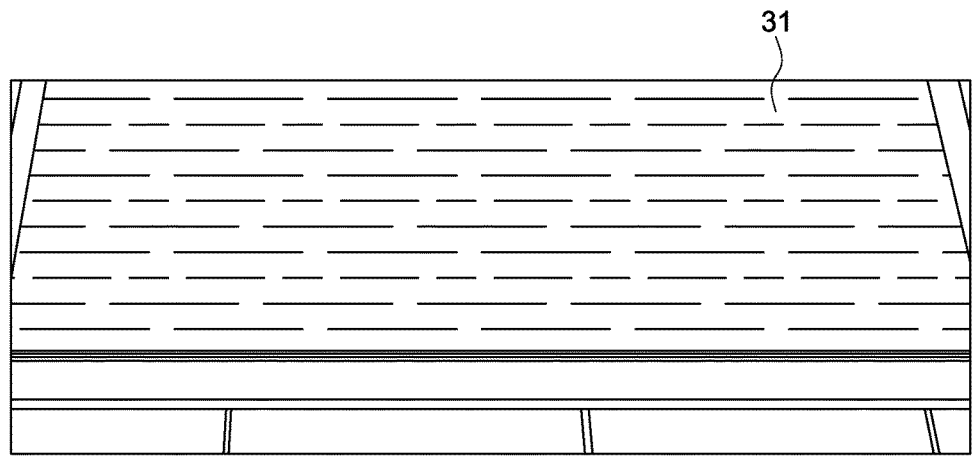
FIG. 11 is photo of detail of floor installation 31, where the colored center groove simplifies the laying of a chipboard panel to the center of the structural/constructional element.
Figure 12:
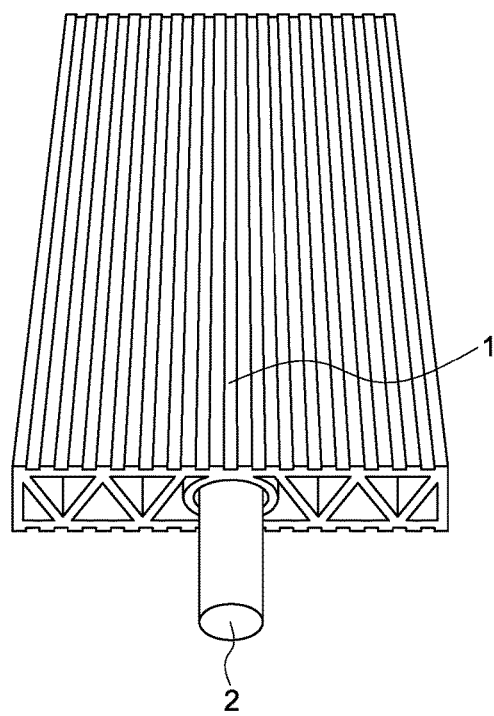
FIG. 12 is an example of inserted pin to the element.
Figure 13:
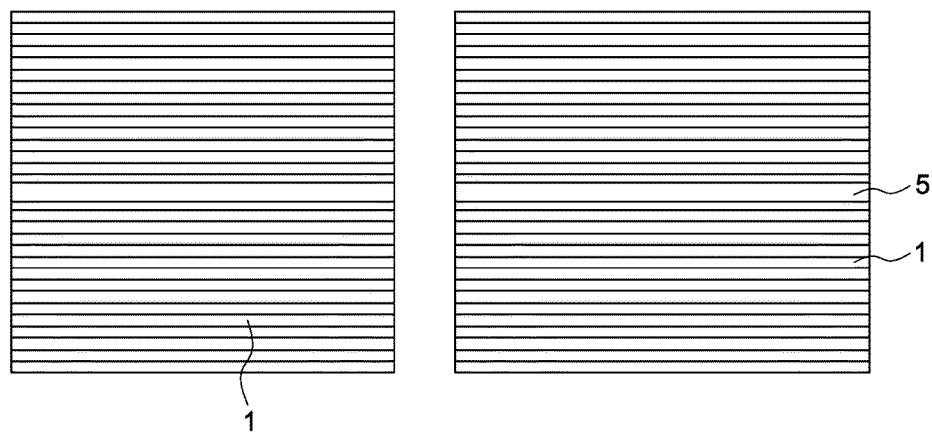
FIG. 13 shows how the colored center groove simplifies holding the floor level during its installation even in the case where the elements are not directly adjacent to each other.
Figure 14:
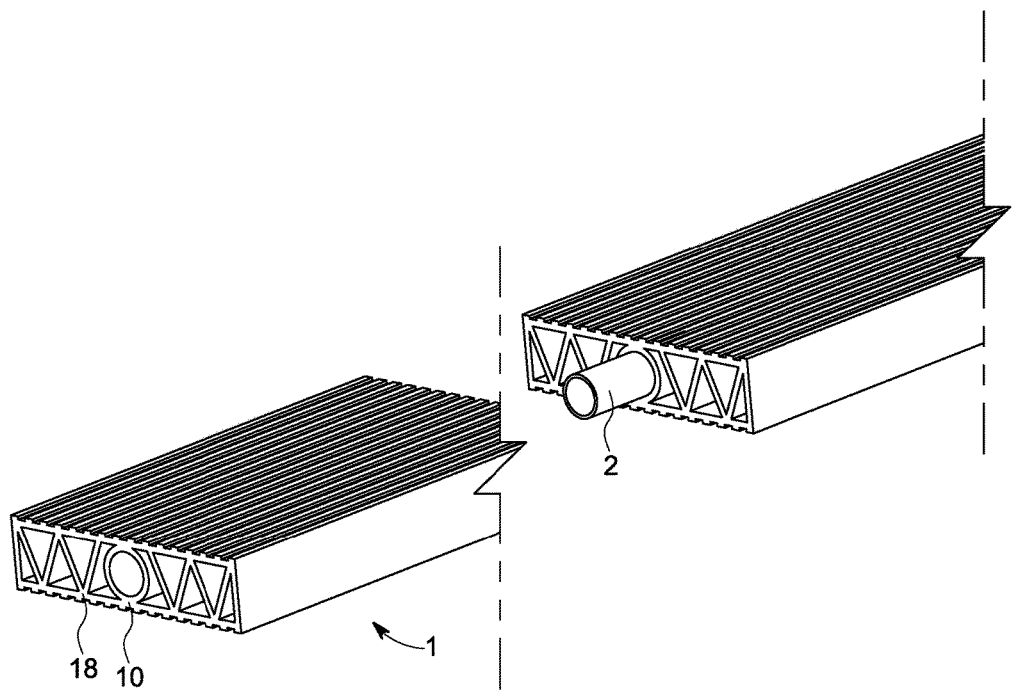
FIG. 14 shows a connection of two elements with a pin
Figure 15:
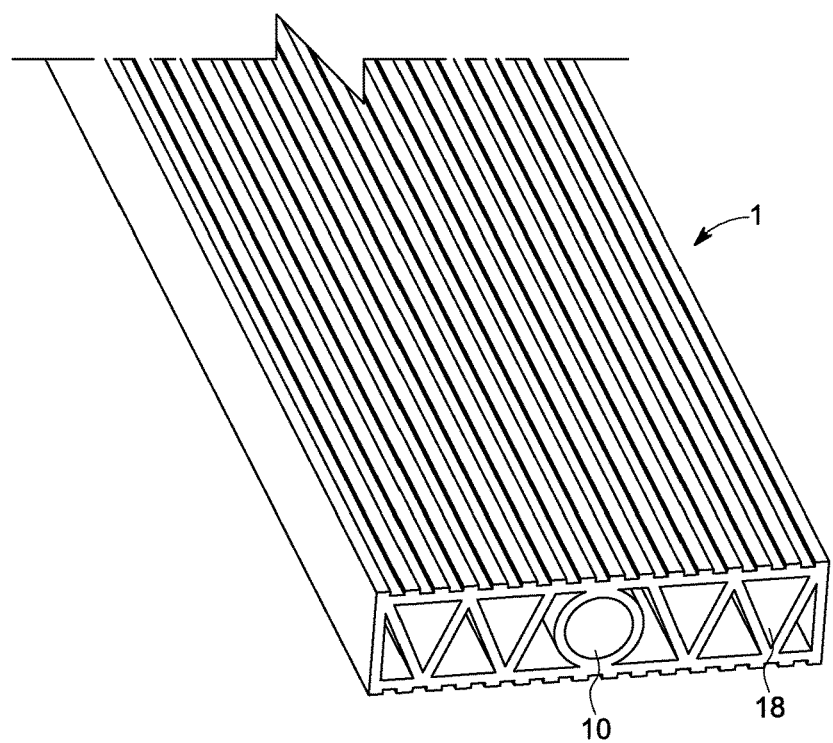
FIG. 15 shows how are already connected elements easier to even out for example with the use of a laser thanks to the colored center groove.

The structural/constructional element according to the invention was cut and laid on the floor 4× in whole the size of 850×80 mm, 3× in whole the size of 400 mm×80 mm, 1 piece of 200 mm×80 mm and 24 pieces of 80 mm×80 mm. On top of this were laid a layer of impregnated OSB panels 12 with a thickness of 15 mm and on them was fixed PVC covering 11 with double-sided adhesive tape as shown in FIG. 11.

Example 3—Laying of the Terrace Floor

Figure 1:
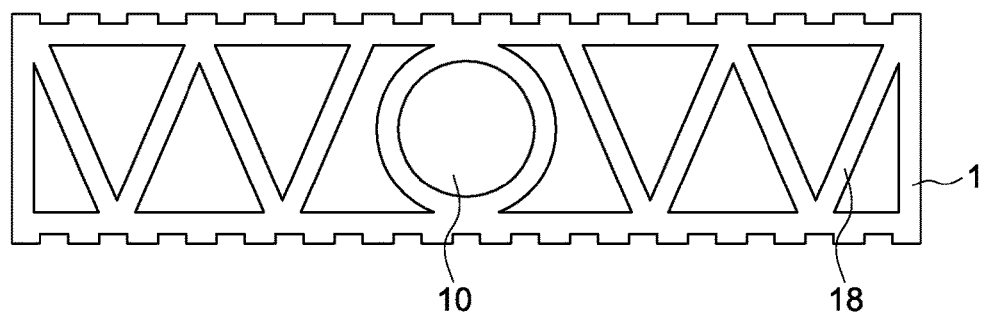
FIG. 1 shows a cross section of the basic structural/constructional element according to the invention.
Figure 2:
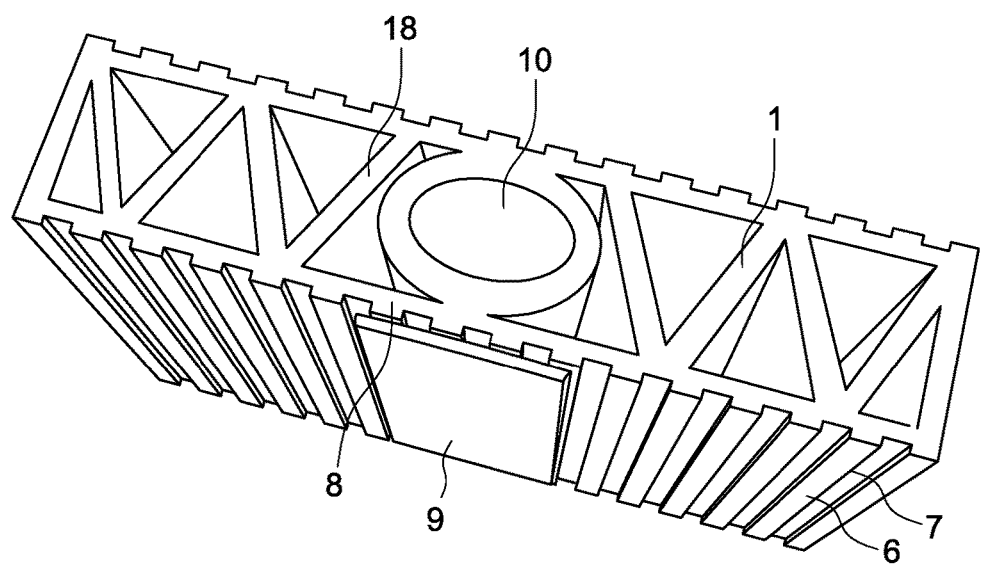
FIG. 2 is a perspective of the structural/constructional element with adhesive material.
Figure 3:
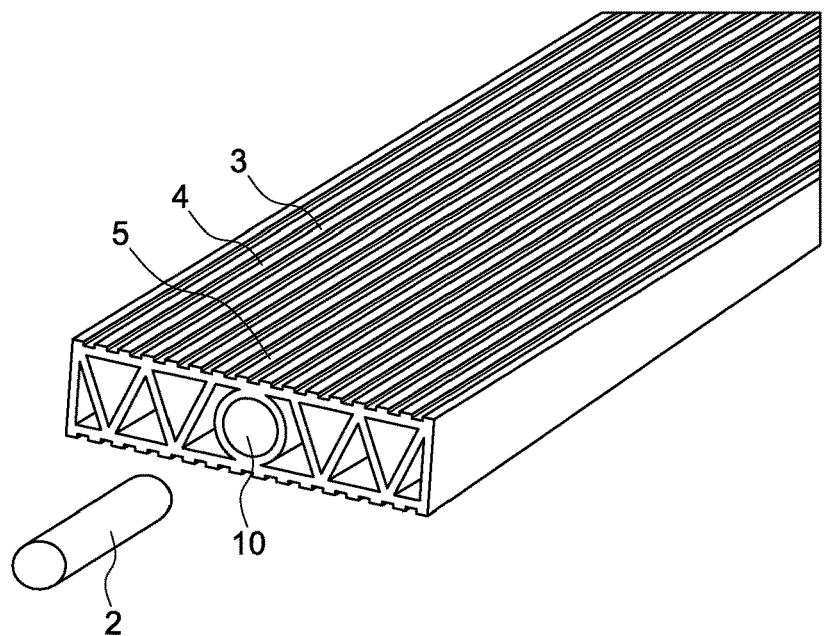
FIG. 3 is a perspective view of the element with a pin.
Figure 4:
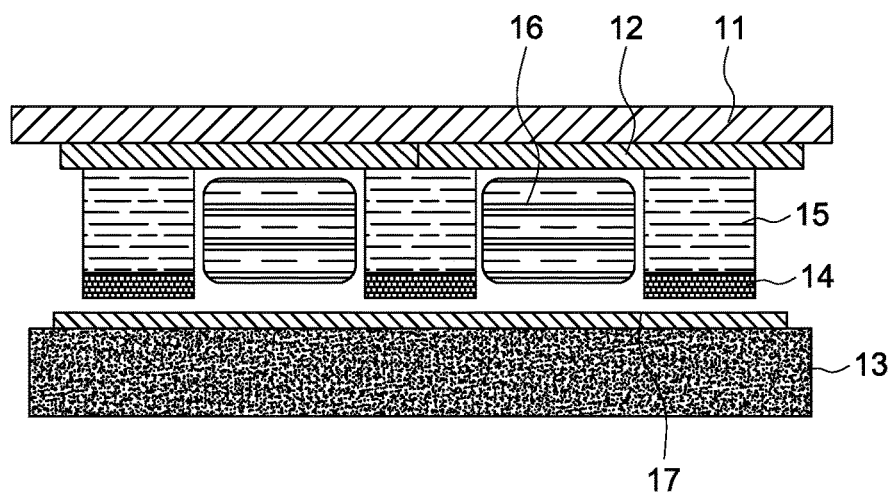
FIG. 4 is a cross-section of the existing laid floor with a wooden grate.
Figure 5:
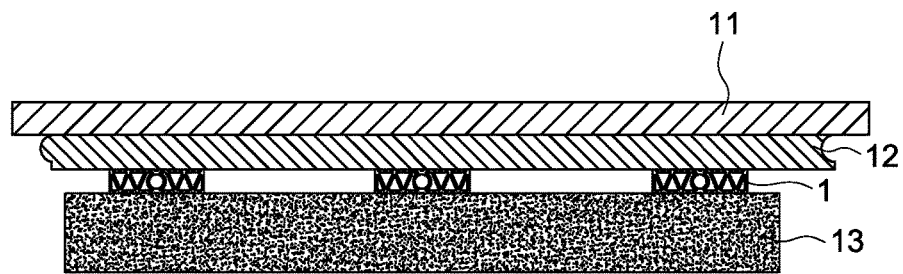
FIG. 5 is cross-section of the newly laid floor with the structural/constructional element according to the invention.
Figure 6:
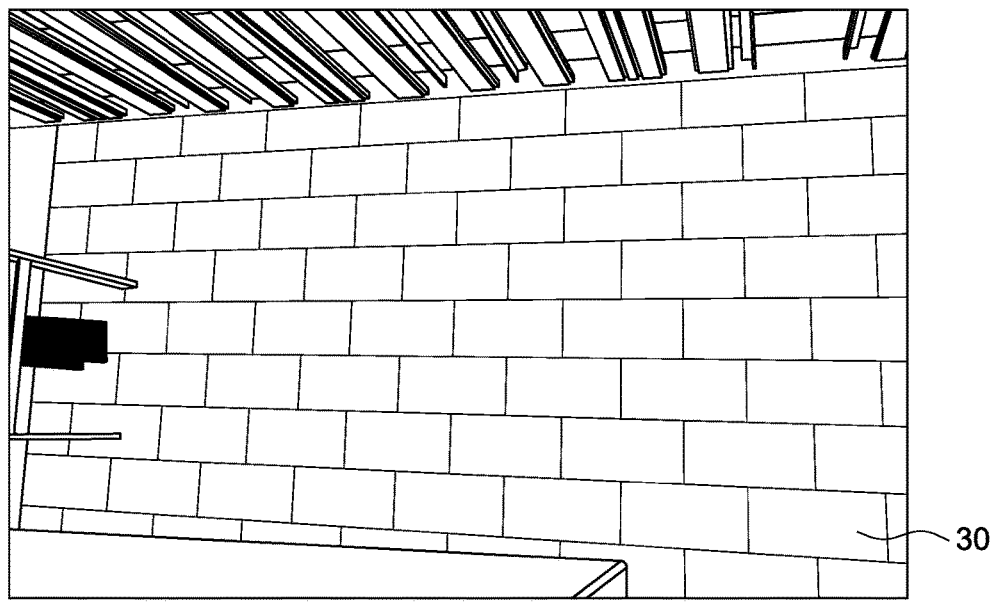
FIG. 6 is photo of a balcony floor 30 before its renovation.
Figure 7:
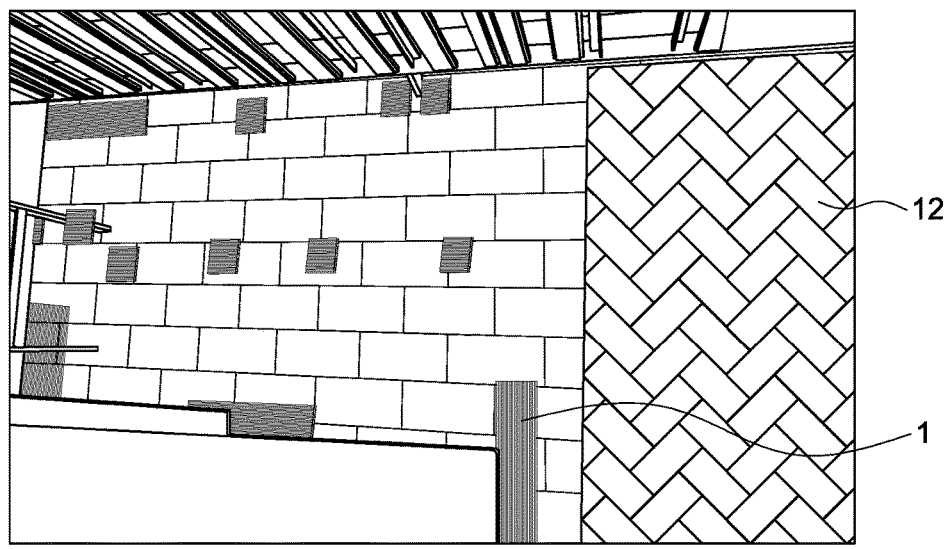
FIG. 7 is photo of a semi renovated balcony floor.
Figure 8:
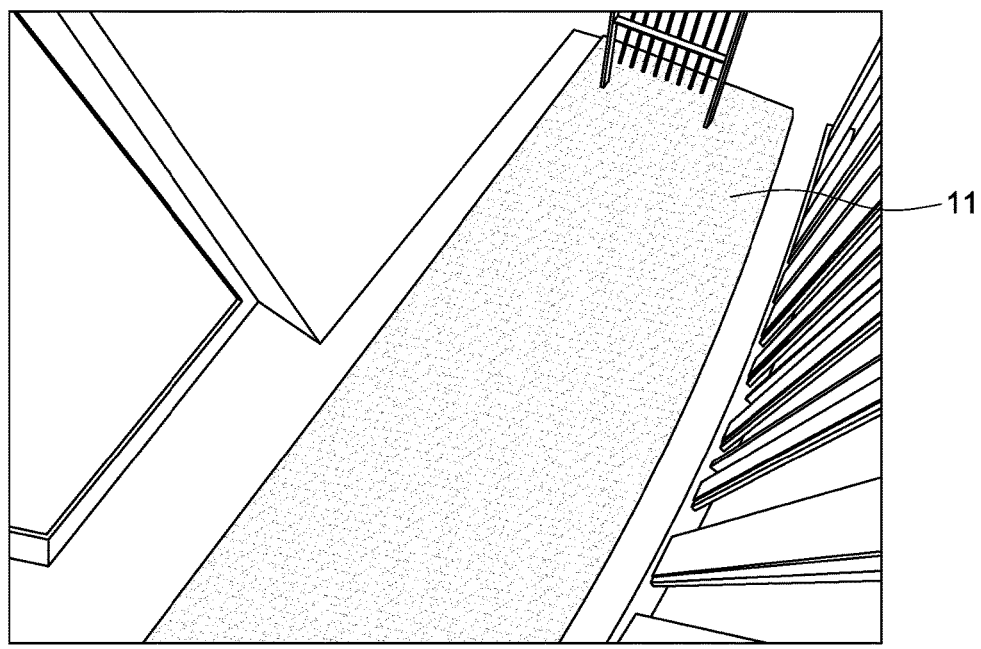
FIG. 8 is photo of a finished renovation of a balcony floor.
Figure 9:
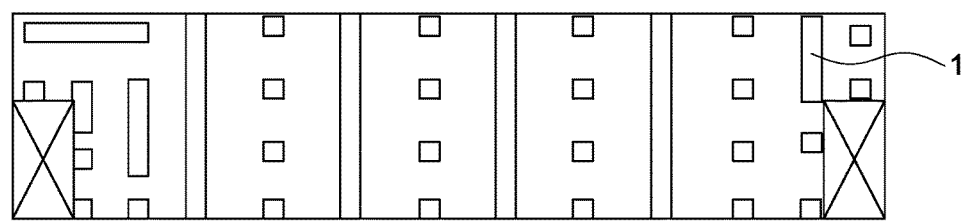
FIG. 9 is layout scheme of the structural/constructional element during a floor installation on an open terrace of a family house in Prague 5, CZ.

For laying of the unroofed terrace floor were the structural/constructional element according to the invention and the example 1 laid freely on a flat, stable surface. The size of the terrace was 2.2 m×0.96 m, as shown in FIG. 9 from the laying of 15.1.2016.

The structural/constructional element according to the invention was cut and laid on the floor 7× in whole the size of 300×80 mm, 12 pieces of 80 mm×80 mm and 1 piece of 20 mm×80 mm. On top of this were laid a layer of impregnated OSB panels 12 with a thickness of 15 mm and on them was fixed PVC covering 11 with double-sided adhesive tape.

Example 4—Bench Underlay

The structural/constructional element according to the invention of composition based on thermoplastic elastomers, whose base is monomer ethylene-propylene-diene and polypropylene.

The structural/constructional element according to the invention was used as an absorbing pad and simultaneously heat and sound insulation including anti-slip function on the bench legs, to which it was attached by double-sided adhesive tape. This has increased the comfort of the landing and with movement on the bench or with the bench, which was completely stable didn't creak.

Example 5—Washing Machine Underlay

The structural/constructional element according to the invention of composition thermoplastic elastomers based on polyvinylchloride.

The structural/constructional element according to the invention was used as an absorbing pad and simultaneously sound insulation including anti-slip function the size of 80 mm×80 mm under 4 feet of the washing machine. This led to a significant sound deadening of the washing machine and a complete stabilization of its position.

Example 6—Mattress Underlay

The structural/constructional element according to the invention of composition thermoplastic elastomers based on polyvinylchloride as in example 5.

The structural/constructional element according to the invention was used as an absorbing pad and simultaneously sound insulation including anti-slip function as pads under the mattress on lamellar grates in the bed, where a several of these elements the size of 80 mm×1.25 m were laid on the grate perpendicularly to the slats. This led to a significant elimination of the unpleasant creaking noise when lying down and turning of a person on the bed stabilizing the position of a mattress on the bed grate.

Example 7—Speaker Underlay

The structural/constructional element according to the invention and the example 1 was used as an absorbing pad and simultaneously sound insulation including anti-slip function as pads under the speakers, particularly during public musical productions, which substantially eliminates annoying vibrations in closed rooms and perfectly stabilizes the position of the free-standing speakers.

Example 8—Dancing Floor

Figure 16:
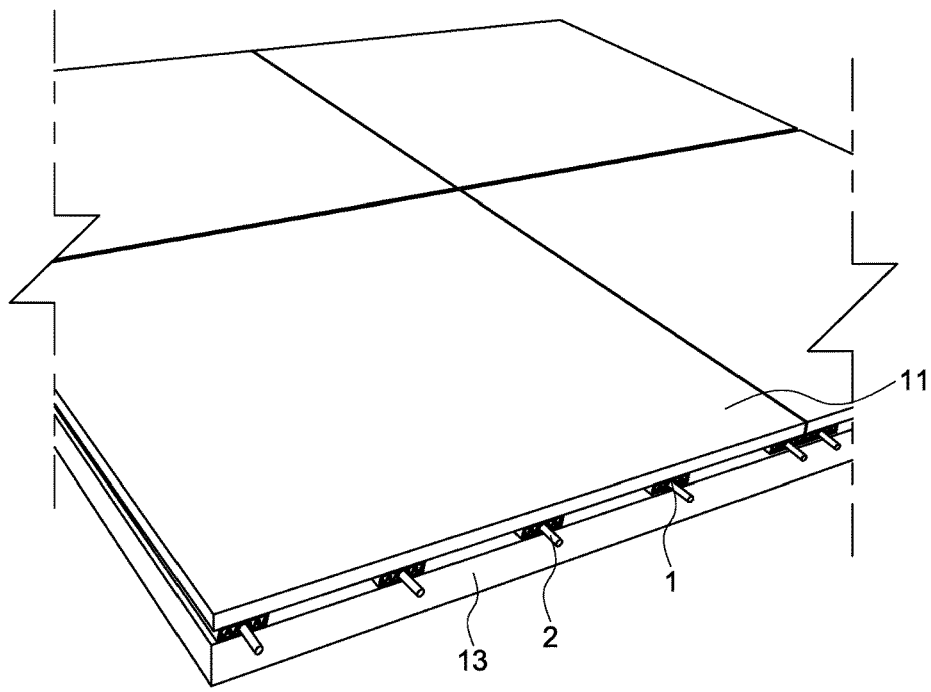
FIG. 16 represents a variable, portable and easily demountable dance floor for the purpose of sports, educational, presentational including exhibitions and fairs.
Figure 17:
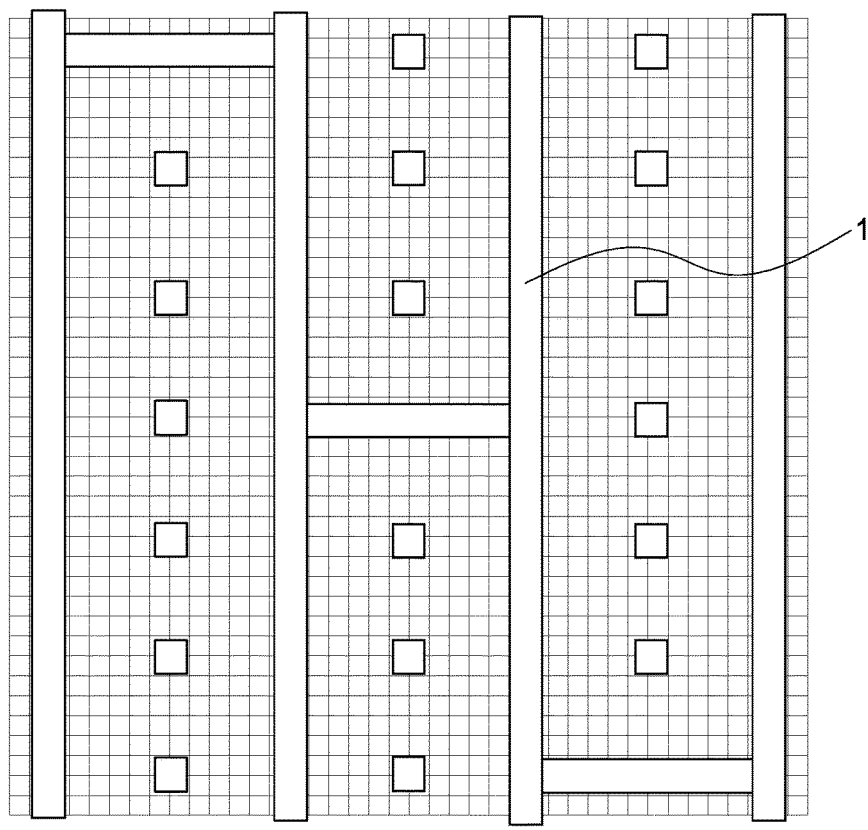
FIG. 17 is a technical scheme—a 2D top view on the underlying base construction—self-supporting load bearing system for sporting floors with dampening ability, built on the base of the constructional/structural/constructional element according to the invention of the CZ PV 2016-42 with a height of 20 mm, showing chosen placement and redistribution of each element: a) linear profiles, width=80 mm of any requested length (optional on the base of current project dimensions and requirements, because it is produced with extrusion technology in form of "never-ending belts", supplied in rolls from 10-50 m), b) vertical fixing element with a length of 80×600 mm, c) dampening pad of size 80×80 mm. Design is accenting the fixation and high stability of the whole subfloor construction due to the application of vertical fixing profiles. The combination of "whole" profile element and "cut" pad brings a significant financial advantage and cost-saving. In this case the spacing of each element represents a regular intervals 260 mm.
Figure 18:
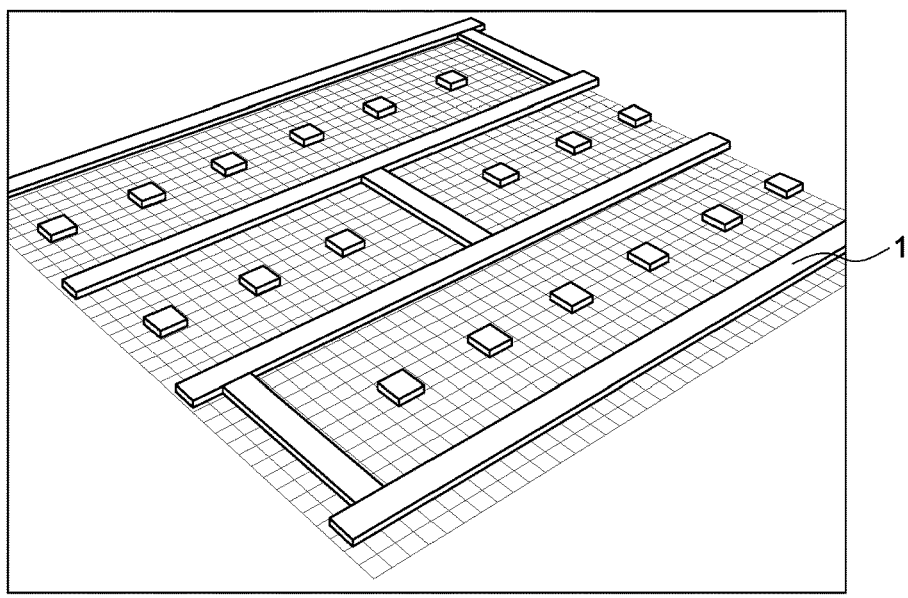
FIG. 18 is a technical 3D-scheme, view on underlying base construction self-supporting load bearing system for sporting floors with dampening ability, built on the base of the constructional/structural/constructional element according to the invention of the CZ PV 2016-42 with a height of 20 mm, dimensions and all other measurements like in the FIG. 17.
Figure 19:
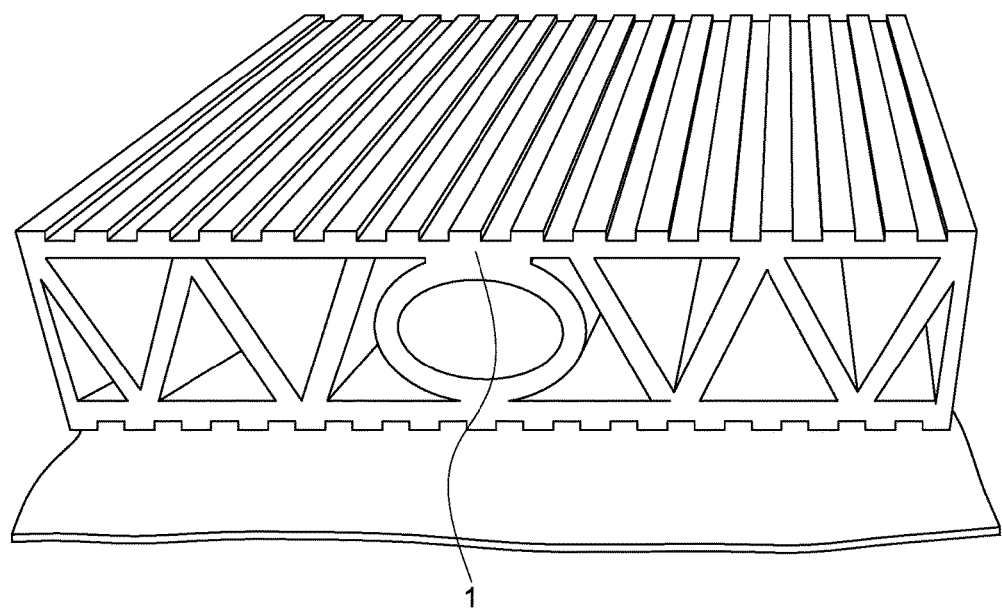
FIG. 19—Constructional/structural/constructional element according to the invention of the CZ PV 2016-45 with applied adhesive fixing tape with high adhesive strength to selected surfaces (concrete, wood, tiles), v=20 mm, w=80 mm, length is optional, made of rubber compound based on rubbers SBR.
Figure 20:
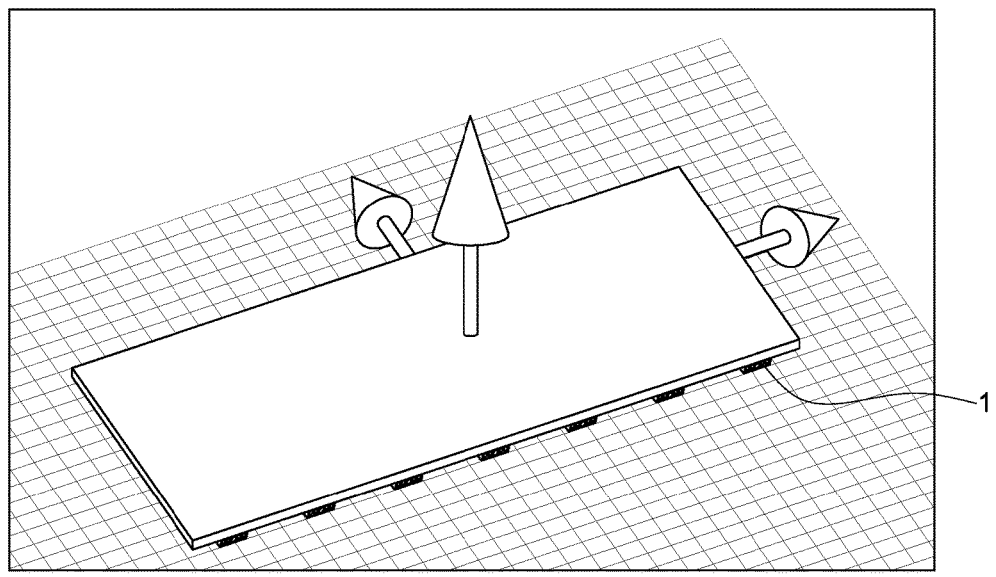
FIG. 20—Constructional/structural/constructional element according to the invention of the CZ PV 2016-45 equipped with double sided adhesive tape, fixed onto the bottom side of the OSB/Plywood Plate, spacing in regular interval of 28 cm (distance from the edge of the OSB Boards means 140 mm), the element's are: h=20 mm, w=80 mm, 1=1250 mm, made of rubber compound on the base of natural rubber (NR)
Figure 21:
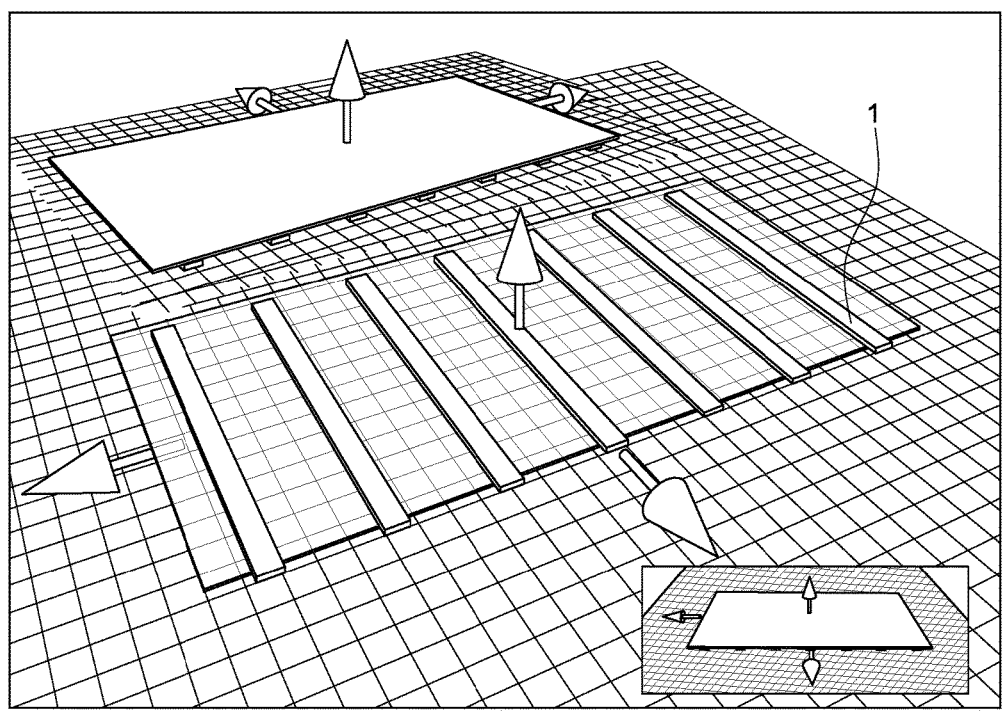
FIG. 21—Constructional/structural element according to the invention of the CZ PV 2016-45 equipped with double sided adhesive tape, fixed onto the bottom of OSB/plywood board—3D scheme, which shows the internal cut through the OSB board—all other parameters like as in FIG. 20.
Figure 22:
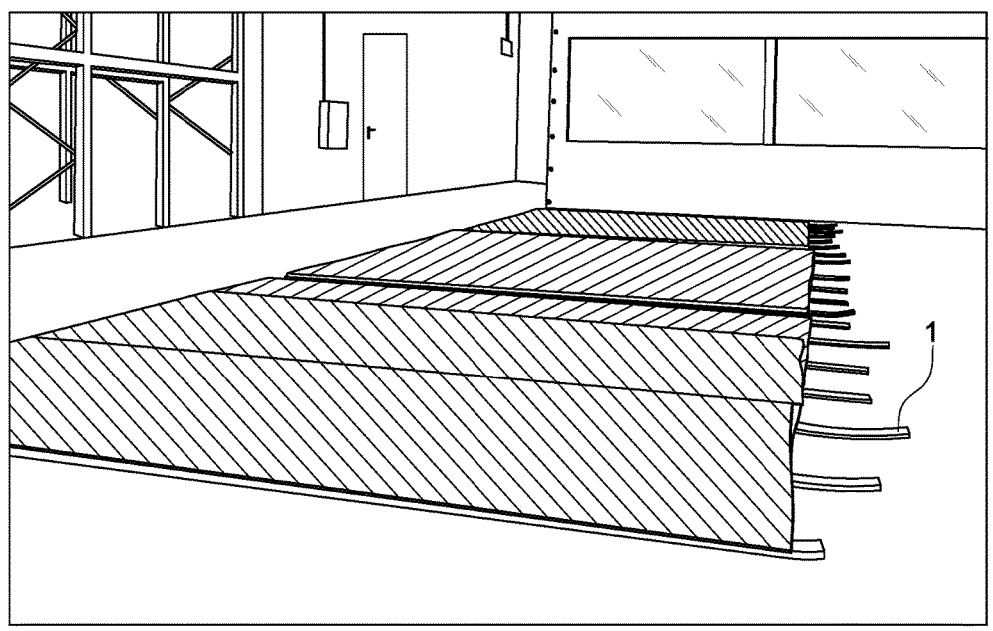
FIG. 22—Prepared testing polygons of multi-functional sports surfaces, before the application of final top-coat layer, composed of multilayer synthetic resins based on EP and PUR binder. Afterwards there will be running intensive tests of shock absorbing, impact control, vibrations absorption and dampening ability. Place of installation Poland (Poznan), dimensions of teach test-polygon: 3.50×3.50 m.
Figure 23:
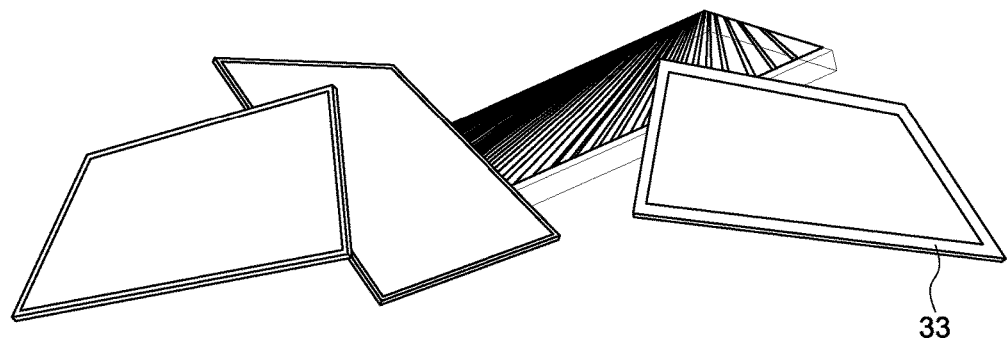
FIG. 23 there are shown different looks and effects of the laminated surface 33, as an example of multiple color options of the light panel according to the invention, view from the upperside under various angles.
Figure 24:
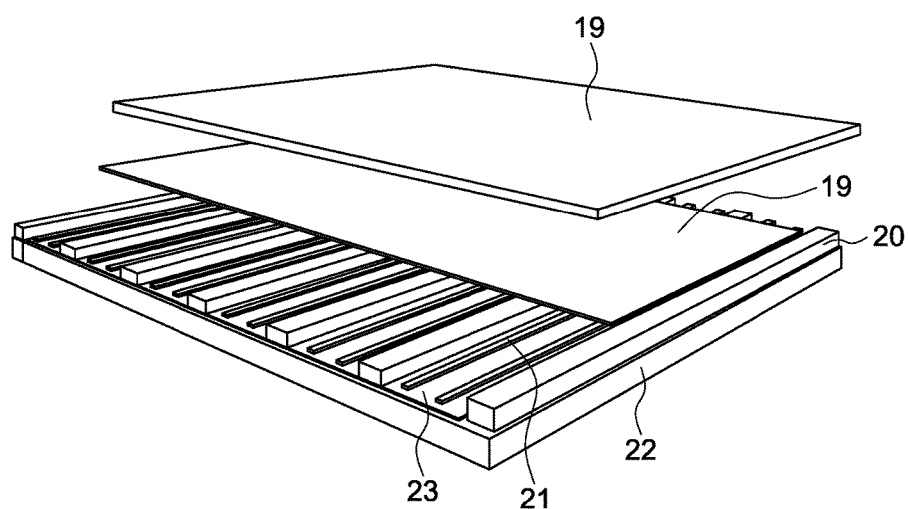
FIG. 24 there is shown a 3D cut with the view through/into the construction of the light panel according to the invention, which gives a clear idea about the structural composition of individual components.
Figure 25:
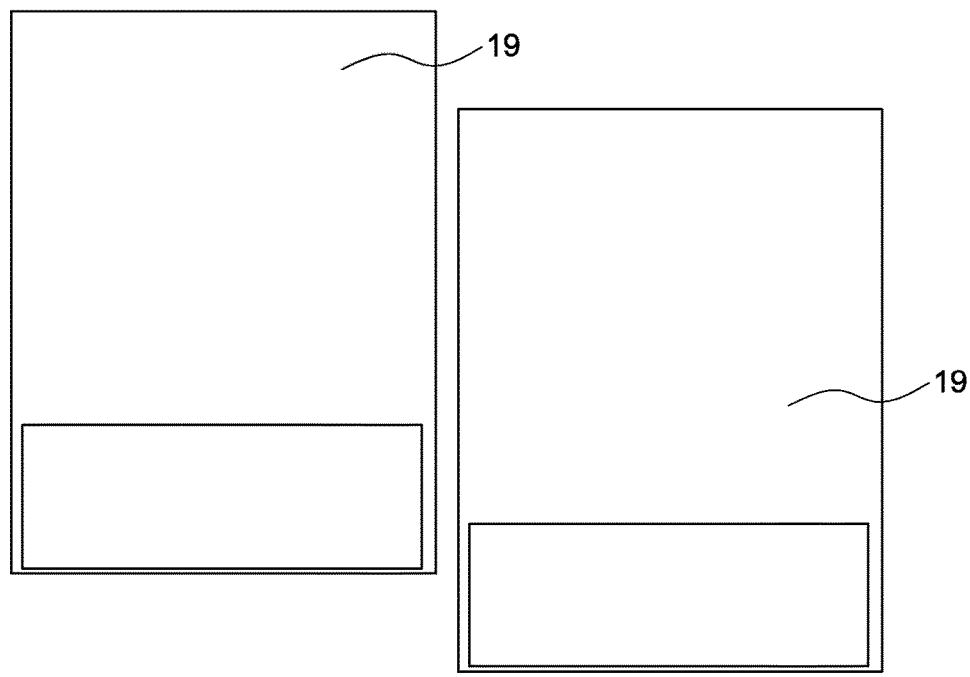
FIG. 25 there is shown an example of the top-layer surface appearance without luminance, namely there are illustrated transparent and translucent plates of polycarbonate, thickness 10 mm as 2 variants of final surface of the light panel according to the invention.
Figure 26:
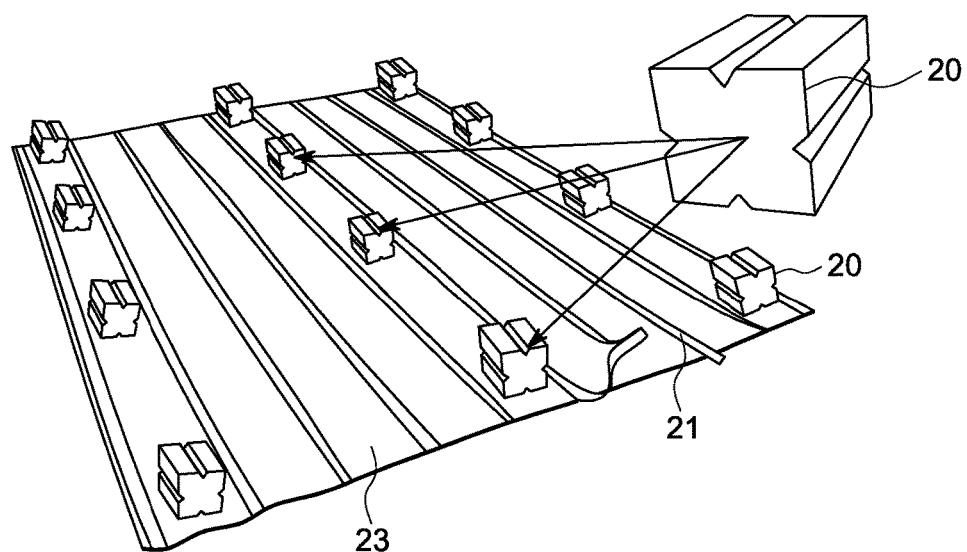
FIG. 26 there is shown an inner structure of the light construction panel according to the invention—in this particular case, the constructional/structural element according to the CZ PV 2016-42 has the shape of an "X", is made of transparent material "2K-silicone" system binder-catalyst, with a hardness 45 to 50'Sha, the dimensions of the building element according to CZ PV 2016-42 are 40×40×40 mm, the mutual spacing intervals represent 160-180 mm.
Figure 27A:
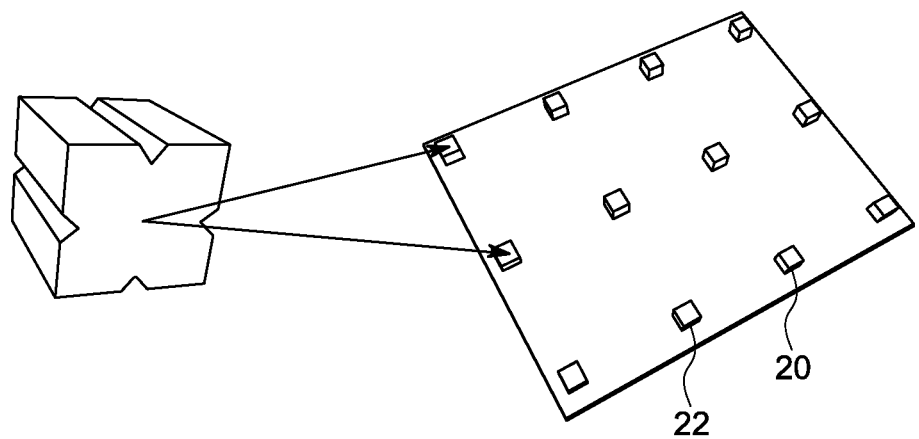
Figure 27B:
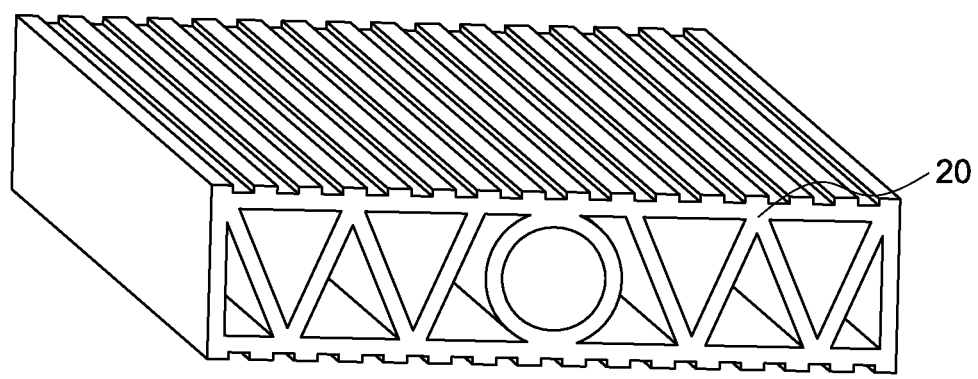
Figure 27C:
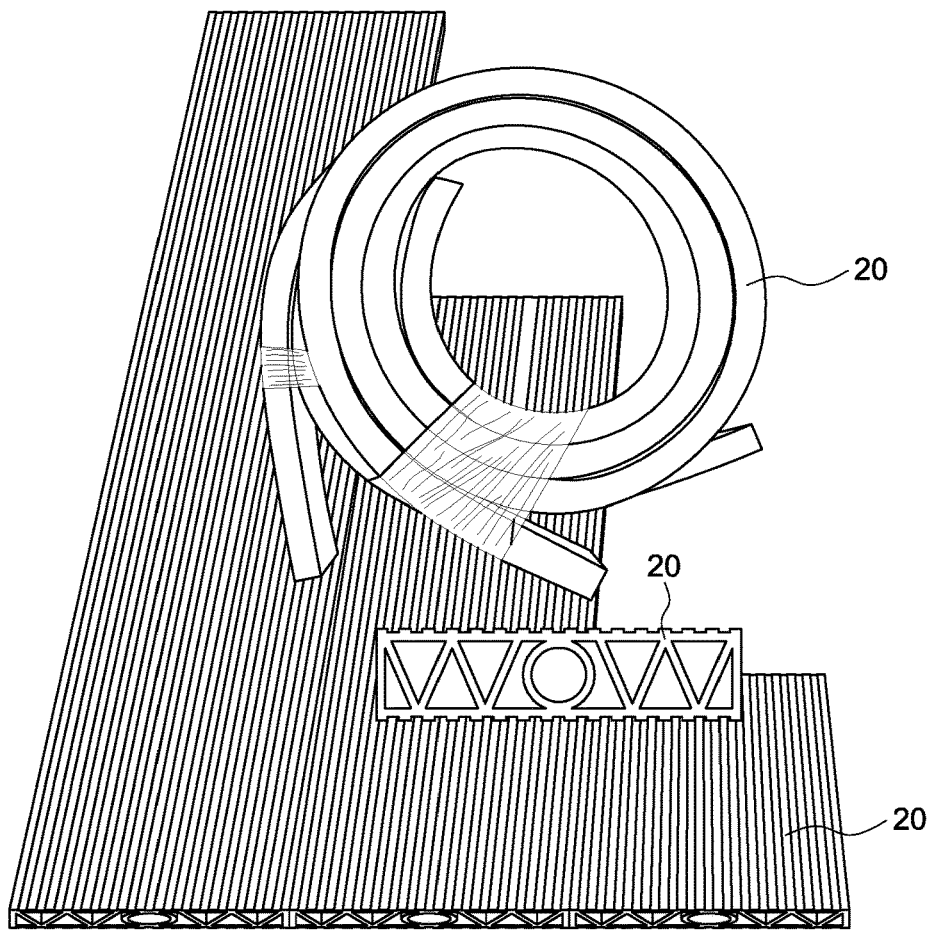
Figure 27D:
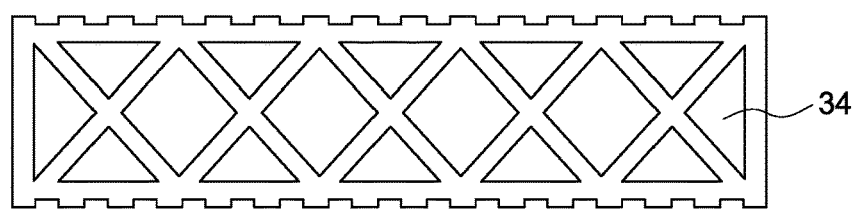

The structural/constructional element according to the invention and the example 1 was used as an underlying basis for a dance floor, which also provides a necessary flexibility of the surface for the use in a dance studio for children and youth. On top of this were laid a layer of impregnated OSB panels 12 with a thickness of 18 mm, 1× layer of anti-slip foil (LLDPE Mirelon or e.g. silicone) and a top floor layer in the form of vinyl surface 11, see FIG. 16.

Example 9

Diagonal placing/redistribution of structural/constructional elements according to invention with the use of parallel fixing structural/constructional element—used for construction of test-polygon of multi-layer sporting floor, with dimensions: 3.50×3.50 m, whose composition consists of:
1. Base plate—solid smooth concrete surface (after leveling)
2. Structural/constructional element according to invention, dimensions 80×1250 mm, height 20 mm, made from compound based on NR/SBR (Natural Rubber+ synthetic Styrene-Butadiene-Rubber-
3. First layer of OSB/Plywood Board, dimensions 1250× 2500 mm, thickness 10 mm
4. Second layer of OSB/Plywood Board, dimensions 1250×2500 mm, thickness 10 mm
5. Liquid, Self-leveling multi-functional flooring surface, based on 2 layers of synthetic resins (2-Component-Epoxy base coat, 2K-PUR Top-Coat with UV filter).

Redistribution/placing of the structural/constructional element according to the invention on the OSB/Plywood plate has a diagonal direction, with the use of parallel fixing element, spaced every 3 m in a single row. Regular spacing in regular intervals of 280 mm between every used element form—profiles or pads—and in every direction.

Example 10

The linear layout/redistribution of structural/constructional element according to invention on the floor of testing polygon, who's dimensions are 3.50×3.50 m is composed from following individual layers:
1. Base plate—solid smooth concrete surface (after leveling)
2. Structural/constructional element according to invention, dimensions 80×1250 mm, height 20 mm, made from compound based on NR/SBR (Natural Rubber+ synthetic Styrene-Butadiene-Rubber-
3. One layer of OSB/Plywood Board, dimensions 1250× 2500 mm, thickness 10 mm
4. Liquid, self-leveling multi-functional flooring surface, based on 3 layers of synthetic resins (2-Component-Epoxy base coat, 2K-PUR water based top-coat, 2K-PUR clear coat with UV protection).

Redistribution/placing of the structural/constructional element according to the invention on the OSB/Plywood plate has a linear direction in regular intervals of 280 mm, for 1 piece of OSB/Plywood plate there are used 7 pcs. of structural/constructional element according to the invention with dimensions 80×1250 mm, with thickness of 20 mm.

Example 11

Light panel according to the invention has been used as dance floor with light effects and installed at the Dance Club (Prague 3): on the prepared base/under layer—with smooth surface reached with levelling, there was installed an entertaining flooring block with the total area of 25 m²—composing of light panels according to the invention (dance area in the shape of a square with diameters of 5×5 m, build up with 5 pieces of polymer blocks with size of each block of 5×1 m). Construction of the base+load-bearing beams uses in this case the structural/constructional element 20 according to the CZ PV 2016-42 in the total quantity of 400 (16 pcs. per 1 m2), in this case made from translucent polymer on the base of PVC, with hardness of 70 'Sha, structural/constructional elements 20 have been installed at regular intervals per 280 mm.

Example 12

Light panel according to the invention has been used as signalization and navigating lightning strip/block installed on public/communal places and buildings (as hospitals, courts, etc.) and/or large scale public events with high traffic and huge quantity of participants/visitors (concerts, festivals), dividing and defining individual sections of the building/venue/area with chosen color, which helps to participants in the orientation and navigates them into the requested places. In this individual case the main navigation is similar to the "tourist signs on the trees," and while luminous panels in the cut shape of arrow with the size 300×700 mm, located at a distances of 20, 50 and 100 m, at a height of 1.80 m in spots alongside the whole walking trip. In the most difficult areas, where more routes are crossing, to make the orientation more ease—the panels are placed also on the walking surface, where each participant/visitor must walk through such a place/spot, by crossing these light panels according to the invention navigates them easily by light-indicating direction as a signpost. Light panel according to the invention as signpost consists of 5 belts of engineered building element 20 according to EN PV 2016-42, have size: height=20 mm, width=80 mm, length varies from 1 m and is always adjusted as necessary according to the length of marking place. Light panel according to the invention in this case consists of the following components:
A) Base plate 22 with a thickness of 10 mm made of the white solid PVC as a underlying plate (the contact surface with the ground) with applied anti-slip silicone matt 3 mm thick
(B). Structural/constructional elements 20, total quantity 5 pcs profiled belts, width of 80 mm, spaced per 150 mm, at regular intervals on 1 m² light panel
(C). Diffusion foil applied with adhesive thick from 0.3 to 3 mm from transparent PVC,
(D). Top-layer plate 19, which at the same time a walkable area; presumed and projected high mechanical load (random and cyclic pressure) make the choice: PA or PC plate with the minimum thickness 15 mm or 20 mm, or more
(E). Top protection foil 25—features decorative, diffuse and non-slip.
Note: due to the high mechanical resistance of damage in the event of the participant's aggressive behavior, vandalism and disorderly conduct Example 13

Light panel according to the invention has been used for the construction of segmental, easily demountable dance floor with the segment size 1×1 m, with an optional and variable surface (gloss, semi mat, mat, satin, fine structure, structure of gross, stripes, bitmaps, 3D film), reacting with light effects on currently playing music. System side interlocked locks ensures connectivity and create a solid surface without visual defects (squares). After creating the desired shape from polygons 1×1 m application of protective and decorative foil 25.

Example 14

Light panel according to the invention has been used as a sporting- and design-floor in fitness center with the main target—support the collective sports by using music to increase the motivation of people, for example. Aerobics, spinning etc.

Example 15

Light panel according to the invention has been used as a part of security system—securing a selected area with the use of the optical motion sensors, placed under the surface-level, which so far did not allow any other floor system (with the exception of the glass floor, which, however, has a number of other negative mechanical properties).

Example 16

Light panel according to the invention has been used for children's playing area for outdoors and indoors with the main 2 functions—decorative and entertaining features with the target to support the will of the children for more movement and physical activities. Programmable light effects for each installed LED-panels 21 enable different motion games, during the night the "mood lighting" with very low power consumption, ensuring an undisturbed night's sleep without the need for lighting in the hallway and/or open doors in the case that the child is afraid of dark areas.

Example 17

Light panel according to the invention has been used for the construction of a variable segment stage for marketing promotions and trade shows, with the use as s mighty presentation tool with the goal to enforce the sale power.

Example 18

Light panel according to the invention has been used as place-marking (area defining) medium in the form of light strip, the main body placed under the ground, so the top-layer plate is in the level of remaining surface or on the ground (because the height of the whole system of 5 cm, the top-layer plate was placed 5 cm above the ambient surface). It is suitable e.g. for installation, where a place-border is needed to be signed: VIP zone, prohibition on entry, the area for input with specific authorization . . . etc.

Example 19

Light panel according to the invention has been used on a military training like a light and signalization element, helping with orientation for people in the case of natural catastrophes or other disasters, where is supposed a huge concentration of people, chaotic behavior, physical and psychical pressure. The panel helps by orientation and avoids many repeatedly given questions about directions, so the intervening military units can spend their time more effective. The panel is due to its resistance very suitable for such a kind of action, it is not damaged by rain, snow, water or other liquids.

Example 20

Light panel according to the invention was applied to an alternative solution for the location of LED strips to design the construction element according to the CZ PV 2016-42, which is also hollow and constructed with flexible lamellas in the "V-shape, ensuring shock-absorption, impact control and dampening ability. In this case it was a variant with lowered thickness (height) is just 7 mm, width=80 mm, length arbitrary, since it is made by extrusion and supplies are available in rolls. This solution enables the integration of LED strip and thanks to a sufficient number of chambers is also possible installation of an integrated underfloor heating based on resistance wire. The product is made from components on the basis of EPDM and has been developed in particular for floating floors.

Example 21

Light panel according to the invention has been used to build children's entertainment game: the jumping/hopscotch, consisting of light LED panels, cut on segments of size: 400×400 mm, total quantity=10 pcs. Square panels of 400×400 mm and 1 pc. Round circle with radius r=300 mm. This example of use is illustrated in FIG. 31.

INDUSTRIAL APPLICABILITY

The new structural/constructional element based mainly on the modified polymer and/or elastomeric materials based on India rubber mixtures completely replaces the wooden grate, which is now needed when laying floors. Its base portion is hollow and has an inner reinforcement in the shape of letters WOW or MOM, which provides its stable bearing capacity and connectivity of the building blocks by inserting a central pin, since the diameter of the pin corresponds to the inner diameter of the opening in the ribbing, when at least the upper surface of the structural/constructional element is provided with a longitudinal groove. The colored groove on the upper surface and the adhesive matter at the bottom of the structural/constructional element leads to a significantly accelerated laying of the floor.

Also the new light panel according to the invention represent a new kind of resistive lightning panel/block, which disposes of unique functional properties, which enables a very wide scale of possible applications—until this moment unreachable for such a kind of product—e.g. flooring systems, wall-protection or decoration for outdoors as a functional protective+design element and/or as a complex system with integrated heating system with high mechanical resistance and load-power, enabling the choice from many variable properties and options—the main target area of use shell be the sporting floors, laminating, design-oriented, signalization and navigation lighting blocks for communal buildings as well as for private households, due to its functionality is expected a common usage in the field of promotion, advertising, entertainment industry, arts and culture, security systems and many other segments—in particular, due to its high universality and many variable properties, which depends on the presumed installation purpose and kind of use, it is a multi-functional, multi-purpose, variable and unique technical solution.

Explanation of Abbreviations Used in the Text

LED—Light Emitting Diode
RGB+White—Red Green Blue—color spectrum can be reach just with 3 basic color shades, technology based on mixing of the 3 basic colors enables to reach every possible color from the entire Photo-spectrum of the human eye+ adding straight White light (higher luminosity)
OSB—oriented strand board (pressed and glued with synthetic resin)
NR/SBR—Natural rubber+synthetic Styrene-Butadiene-Rubber
EPDM—monomer ethylene-propylene-diene
NR—natural rubber
SBR—styrene-butadiene rubber
TPE—thermoplastic elastomers
TPV—thermoplastic vulcanizates
PP—polypropylene
PE—polyethylene
PVC—polyvinylchloride
Note 1: EPDM also sometimes refers to Ethylene Propylene Diene terpolymer instead of Monomer or also unconjugated (Monomer)
Note 2: In the rubber mixtures is the concentration/content of the individual ingredients abbreviated as "dsk"=parts per hundred parts rubber or also "phr"=parts per hundred rubber. The basis of a rubber mixtures always consists of 100 parts of rubber (one or more types together). If is the used rubber mixed with oil or soot, its dosage must be increased, so even such mixture has 100 parts of rubber. Using 100 parts of rubber as the basis of a mixture simplifies dosage of non-rubber ingredients, because expressing their concentration with the same value of phr ensures the same concentration of India rubber/ingredient for a different types of rubber mixtures.

What is claimed is:

1. A structural element, comprising:
a base portion (1) and a connecting central pin (2), characterized by, the base portion (1) being hollow and having a lengthwise extending interior defined by a lower wall, a juxtaposed upper wall and a pair of side walls, the interior having a rectangular cross-section and having an internal reinforcement defined by a zig zag shaped ribbing (18) that zig zags from side to side between the side walls in the interior of the base portion, and a connecting chamber (10) having a circular shape which provides connectivity between the base portion and the connecting central pin (2) so that a cross-section of the pin (2) corresponds to the circular shape of the chamber (10) between the internal reinforcement, an upper surface (3) of the structural element is provided with longitudinal grooves (4) with a depth of up to 2 mm and width up to 5 mm, and is composed of one or more of a modified polymer, elastomeric material based on rubber mixtures, of which foundation is monomer ethylene-propylene-diene or natural rubber or styrene-butadiene rubber, a combination of the natural rubber/styrene-butadiene rubber, further based thermoplastic elastomers, whose base is monomer ethylene-propylene-diene or polypropylene/monomer ethylene-propylene-diene or polyvinylchloride, or further based thermoplastic vulcanizates, whose base is monomer ethylene-propylene-diene and polyethylene or natural or synthetic rubber, modified by polyethylene or polypropylene, wherein India rubber mixtures based on monomer ethylene-propylene-diene consist of 20 to 50% vol. monomer ethylene-propylene-diene, 0.5 to 2% vol. vulcanizing agent, 20 to 50% vol. fillers and 20 to 50% softeners; rubber mixtures based on natural rubber consist of 20 to 50% vol. styrene-butadiene rubber, 0.5 to 50% vol. fillers, 20 to 50% vol. softeners, 0.5 to 2% vulcanizing agent, up to 1% vol. of stearin and up to 2% vol. of antioxidants, up to 2% vol. of accelerators; rubber mixtures based on styrene-butadiene rubber consist of 20 to 50% vol. styrene-butadiene rubber, 0.5 to 2% vol. vulcanizing agent, 20 to 50% vol. fillers and 20 to 50% vol. softeners; rubber mixtures based on natural rubber/styrene-butadiene rubber consist of 20 to 50% vol. mixtures of natural rubber and styrene-butadiene rubber, 0.5 to 2% vol. vulcanizing agent, 20 to 50% vol. fillers and 20 to 50% vol. softeners; thermoplastic elastomers based on monomer ethylene-propylene-diene; thermoplastic elastomers based on the mixture of polypropylene/monomer ethylene-propylene-diene; thermoplastic elastomers based on polyvinylchloride; and thermoplastic vulcanizates based on monomer ethylene-propylene-diene.

2. The structural element according to claim 1, wherein an adhesive tape (9) is inserted to a central groove (8) on a lower surface (6), which is shielded by a removable foil.

3. The structural element according to claim 1, wherein the pin (2) is being formed from the same material as the base portion (1) of the structural element.

4. The structural element according to claim 1, wherein the zig zag shaped ribbing (18) has a shape of one of WOW or MOM.

5. The structural element according to claim 1, wherein the vulcanizing agent is formed by a sulfur or a peroxide.

6. The structural element according to claim 1, wherein a center groove (5) on the upper surface (3) is color-coded.

7. The structural element according to claim 6, wherein a lower surface (6) is also fitted with anti-slip grooves (7).

8. The structural element according to claim 6, wherein an adhesive tape (9) is inserted to a central groove (8) on a lower surface (6), which is shielded by a removable foil.

9. The structural element according to claim 6, wherein the pin (2) is being formed from the same material as the base portion (1) of the structural element.

10. The structural element according to claim 6, wherein the zig zag shaped ribbing (18) has a shape of one of WOW or MOM.

11. The structural element according to claim 6, wherein the vulcanizing agent is formed by a sulfur or a peroxide.

12. The structural element according to claim 1, wherein a lower surface (6) is also fitted with anti-slip grooves (7).

13. The structural element according to claim 12, wherein an adhesive tape (9) is inserted to a central groove (8) on a lower surface (6), which is shielded by a removable foil.

14. The structural element according to claim 12, wherein the zig zag shaped ribbing (18) has a shape of one of WOW or MOM.

15. The structural element according to claim 12, wherein the vulcanizing agent is formed by a sulfur or a peroxide.

16. A light panel, comprising:

the structural element according to claim 1 connected to at least one top-layer plate (19), which is placed and from below supported with specific load-bearing structural elements (20) made of a polymer compound or from a modified polymer compound of a thermoplastic elastomer or vulcanizate with hardness in a range from 30 to 90 'Sha and below, in or between these supporting structural elements (20) are placed LED diode strips (21), which are equipped with adjustable regulation of shine intensity and enable variable choice of color shade.

17. The light panel according to claim 16, wherein the top-layer plate (19) is made of composite material based on polyethylene, polypropylene, poly(methyl methacrylate), styrene-acrylonitrile copolymer, polycarbonate, polyvinyl chloride, transparent silicone, while a thickness of the top-layer plate is from 5 mm to 20 mm.

18. The light panel according to claim 16, including the at least one top-layer plate comprising multiple top plates (19), that are translucent or transparent or colored with a modified or treated surface.

19. The light panel according to claim 16, wherein the top-layer plates (19) are interspersed with foil or film (24) and at least an uppermost surface of the at least one plate is equipped with a cover-film or sheet (25).

20. The light panel according to claim 16, is characterized by, that, under, in or between the load-bearing structural elements (20) are placed at regular intervals LED strips (21), with spacing of these LED strips (21) within 20 to 80 mm.

21. The light panel according to claim 16, connected with an underlying platform (22), which consists of at least one single plate or solid surface to which the light panel is directly fixed, whereby this underlying platform or base plate (22) is equipped with a reflective layer (23).

22. The light panel according to claim 21, wherein the base plate (22) is made of composite material based on polyvinyl chloride, polyethylene, polypropylene, polycarbonate, or OSB panels with a thickness of 6-10 mm.

* * * * *